United States Patent [19]
Yanai

[11] Patent Number: 6,083,071
[45] Date of Patent: Jul. 4, 2000

[54] METHOD FOR WELDING SPRING TO APERTURED GRILL AND WELDING APPARATUS FOR POST-FIXING SPRING TO APERTURED GRILL

[75] Inventor: Kunihiko Yanai, Aichi, Japan

[73] Assignee: Sony Corporation, Tokyo, Japan

[21] Appl. No.: 08/506,869

[22] Filed: Jul. 25, 1995

[30] Foreign Application Priority Data

Jul. 26, 1994 [JP] Japan .................................. 6-194889

[51] Int. Cl.[7] .................................................... H01J 9/14
[52] U.S. Cl. ............................................. 445/30; 445/60
[58] Field of Search .................................. 445/30, 60, 68

[56] References Cited

U.S. PATENT DOCUMENTS

| | | | |
|---|---|---|---|
| 3,724,740 | 4/1973 | Imamura et al. ...................... | 445/30 X |
| 4,164,060 | 8/1979 | Hartta .................................... | 445/30 X |
| 4,188,695 | 2/1980 | Oyama .................................. | 445/30 X |
| 4,963,786 | 10/1990 | Tokita et al. .......................... | 445/30 X |
| 5,692,941 | 12/1997 | Takeda et al. ............................. | 445/30 |

FOREIGN PATENT DOCUMENTS 1089  1/1980  Japan ........................................ 445/30

*Primary Examiner*—Kenneth J. Ramsey
*Attorney, Agent, or Firm*—Hill & Simpson

[57] ABSTRACT

A method and device for manufacturing a CRT enables four springs to be accurately welded to the apertured grill without disordering the relative position of the pin holes in each of the springs even if simultaneous welding is not carried out. The location of the pin hole is indexed in such a way that a space between the surface of the grill and the inner surface of the panel may always be kept constant at any location under a state in which the apertured grill is fixed to the panel. The spring is welded in advance to the spring holders of the lower lateral member and the right and left vertical members in such a way that the pin hole is positioned at the indexed location. The remaining one spring is positioned in such a way that the pin hole is positioned at the indexed location when the apertured grill is positioned to cause the relative positions of the pin holes of the welded three springs to coincide with the relative arrangement of the pins of the lower, right and left skirts of the panel. Then the spring is welded to the spring holder of the upper lateral member.

4 Claims, 19 Drawing Sheets

METHOD FOR WELDING SPRING TO APERTURED GRILL AND WELDING APPARATUS FOR POST-FIXING SPRING TO APERTURED GRILL

BACKGROUND OF THE INVENTION

1. Field of the Invention

The present invention relates to a method for welding panel fixing springs to the four sides of an apertured grill of a color cathode ray tube (hereinafter abbreviated as CRT). Additionally, the present invention relates to a post-fixing spring welding apparatus for welding a spring to one remaining side of the apertured grill to which the springs are welded.

2. Description of the Related Art

A type of CRT having an apertured grill to be used in a television set or a computer or a monitor TV is constructed such that an apertured grill having a plurality of slits formed therein is fixed to an inner side of a panel having fluorescent coatings of three primary colors (R, G, B). Electron beams for the three primary colors injected from electron guns pass through the slits of the apertured grill and are radiated against the fluorescent coating locations corresponding to the respective colors at the inner surface of the panel.

The aforesaid apertured grill is supported by a frame which is substantially formed into a rectangular frame-like shape by the upper, lower, right and left members. A grill is tensioned and arranged on this frame and the aforesaid plurality of slits extend upward and downward and are formed at locations spaced apart laterally on the grill.

The above mentioned panel is comprised of a panel part of a size which is two times larger than that of the aforesaid grill. It has a substantially rectangular shape and a fluorescent coating on its inner surface. Upper, lower, right and left skirts extend from and are formed at the four sides of the panel. The aforesaid panel part is formed to be two times larger than that of the aforesaid grill.

Fixing of the aforesaid apertured grill to the panel is carried out in such a way that the panel fixing springs are welded to three or four members of the apertured grill so as to cause the pin holes of the springs to engage the pins fixed to the inner surfaces of three or four skirts of the panel.

In this way, if the spaces between the surface of the grill and the inner surface of the panel are different from each other depending on their locations when the apertured grill is fixed to the panel, the electron beams which passes through the slits in the grill does not accurately radiate against the corresponding fluorescent coated locations of the panel. This may result in some disadvantages such as color mismatching or the like in the CRT after its complete assembly.

Due to this fact, for a CRT which is used as a monitor in a computer system which requires a high precision display or for a CRT having a large screen size or the like, it is important that the spaces between the surface of the grill and the inner surface of the panel are always kept constant.

A position of the surface of the grill with respect to the inner surface of the panel is determined by a position of the inner surface of the panel as viewed from a plane which includes the three or four pins of the panel and a position of the surface of the grill as viewed from a plane which includes the three or four pin holes of the apertured grill. The position of the inner surface of the panel as viewed from the aforesaid plane is defined due to the fact that the pins are already fixed to the panel.

Due to this fact, the position of the grill surface with respect to the inner surface of the panel is determined, but the positions of the pin holes when the springs are welded to each of the members may substantially influence this. Accordingly, when the springs are welded to each of the members, it is necessary that the welding locations of the springs on the members be made in consideration of the position of each of the pins in the panel.

In recent years, as the size of the CRT screen as well as its weight have increased, a four-point supporting system is frequently employed. This structure has four pins on the panel and four springs on the apertured grill.

When the springs are welded to each of the members of the CRT in the four-point supporting system as described above, it is preferable that the four springs are welded simultaneously in such a way that the relative positions of the pin holes for each of the springs is not displaced.

In this case, since the arrangement and orientation for each of the four springs is different, each of the springs is welded by applying a respective welding machine one by one. This requires four welding machines arranged inside the frame in order to avoid interference with the position setting members or the like of the apertured grill.

However, for a CRT having a relative small screen size such as 16", for example, the size of the frame becomes small in comparison with that of the screen size, so that there was insufficient space for arranging the four welding machines inside the frame and so the simultaneous welding of the four springs was difficult for this structure.

In addition, the simultaneous welding of the four springs generated some disadvantages in that the displacement of the relative positions of the springs could not be maintained within an allowable range even if the displacement of the welded location of each of the springs was within an allowable range. When each of the springs was thus welded to a location slightly displaced from the desired welding location, all the springs were necessarily removed from each of the members and welded to them again.

In light of the foregoing, one solution to this problem is that the pin hole of one spring of the four apertured grill springs is formed to have a larger size than that of the panel pin. A coin having a pin hole with a size engageable with the panel pin is then welded to the spring afterward as in the system disclosed in the gazette of Jap. Pat. Laid-Open No. Hei 5-299017. The positional displacement of each of the springs from the welded locations can be accommodated and corrected through a fine adjustment of the welded location of the coin with respect to the spring even if the four springs are welded separately.

However, this proposed solution had its own flaws and actually, either one or both the coin and the spring were deformed by heat or the like generated when the coin was welded to the spring. Thus the position of the pin hole of the coin after welding to the spring could not be accurately aligned with the position of the corresponding pin of the panel.

In addition, in this type of system, the coin must be welded to the spring when the panel pin is engaged with the coin and the pin hole of the spring and only a slight space is formed between the panel and the coin. This is a disadvantage in that welding between the coin and the spring is very difficult.

SUMMARY OF THE INVENTION

The present invention provides a solution to this known problem without having the disadvantages noted above. It is an object of the present invention to provide a method for welding springs to the apertured grill in which each of the springs can be welded accurately to the apertured grill without displacing the relative position of the pin holes in each of the springs even if the four springs are not simultaneously welded. In accordance with the present invention, the springs can be easily welded to the panel with wide space being assured around the springs without fixing the apertured grill to the panel. Additionally, the present invention includes a welding apparatus capable of accurately welding one remaining spring to the apertured grill to which the three springs are welded.

In order to attain the aforesaid object, the present invention employs a color cathode ray tube comprising a panel. The panel includes upper, lower, right and left skirts which extend from the four sides of the panel. The panel has apertured grill fixing pins fixed to the aforesaid four skirts. The apertured grill arranged inside the aforesaid panel has color selecting grills arranged adjacent to the aforesaid panel inside the four sides facing against each of the aforesaid skirts. The panel fixing springs have pin holes engageable with the aforesaid pins and are welded to each of the sides of the aforesaid apertured grill. Each of the pin holes of each of the aforesaid springs against the aforesaid grill is indexed in response to a position of each of the aforesaid pins against the aforesaid panel. Three of the aforesaid springs are welded simultaneously to the three sides of the aforesaid apertured grill in such a way that the pin holes may be positioned at the aforesaid indexed positions, respectively. Then a spring is abutted against one side where the aforesaid springs are not welded with the aforesaid apertured grill. The aforesaid abutted spring is positioned in such a way that a position of the pin hole of the aforesaid spring and the pin holes of the springs welded to the aforesaid three sides coincide with a location of the corresponding four pins. Then, the aforesaid position set spring is welded to one side of the aforesaid apertured grill.

In addition, in order to attain the aforesaid object, the present invention provides a post-fixing spring welding apparatus for welding a spring to one side having the aforesaid spring not welded with the aforesaid apertured grill in a color cathode ray tube. The cathode ray tube comprises a panel, upper, lower, right and left skirts extend from and are formed with the sides of the panel. The panel has the apertured grill fixing pins fixed to the aforesaid four skirts. The apertured grill arranged inside the aforesaid panel has color selecting grills arranged inside the four sides adjacent to each of the aforesaid skirts in such a way that a space with the aforesaid panel may become constant. Panel fixing springs have pin holes engaged with the pins of the aforesaid three skirts to which the aforesaid three sides are adjacent when the springs are welded to the three sides of the four sides of the aforesaid apertured grill. The aforesaid apertured grill is arranged inside the aforesaid panel.

The first three position setting pins located at each of the reference locations coincide with the positions of the pins of the aforesaid three skirts and engage each of the pin holes of the springs at the aforesaid three skirts. A first engaging and disengaging moving mechanism is employed for moving each of the aforesaid first position setting pins between the aforesaid reference locations and a location where each of the aforesaid first position setting pins is disengaged from the pin holes of the springs at the aforesaid three sides. A fourth position setting pin is placed adjacent to one side of the aforesaid apertured grill when each of the aforesaid first three position setting pins is engaged with the pin holes of the springs at the aforesaid three sides. An arrangement against the aforesaid first three position setting pins is located at the reference location which coincides with the location of the pin at the remaining one skirt against the pins of the aforesaid three skirts. A second engaging and disengaging moving mechanism is employed for moving the aforesaid fourth position setting pin from the aforesaid reference location of the aforesaid fourth position setting pin to a location spaced apart from the aforesaid one side rather than the reference location. A spring supplying means provides a spring to be welded to one side of the aforesaid apertured grill to the aforesaid fourth position setting pin. This is also used for engaging the pin hole of the aforesaid spring to the aforesaid fourth position setting pin. A spring welding means is employed for welding the aforesaid spring having the pin hole engaged with the aforesaid fourth position setting pin to one side of the aforesaid apertured grill at the aforesaid reference location of the aforesaid second position setting pin.

In addition, the present invention is further provided with a first position adjusting moving mechanism for moving at least one first position setting pin of the aforesaid first three position setting pins to a direction crossing with a moving direction of the aforesaid first engaging and disengaging moving mechanism. A second position adjusting and moving mechanism is employed for moving the aforesaid fourth position setting pin to a direction crossing with a moving direction of the aforesaid second engaging and disengaging moving mechanism.

In addition, in present invention a moving amount of the aforesaid first position setting pins with the aforesaid first position adjusting and moving mechanism and a moving amount of the aforesaid fourth position setting pin with the aforesaid second position adjusting and moving mechanism are determined in response to the fixing positions of the aforesaid pins against the aforesaid panel, and twistings of the aforesaid panel and the grill.

A plane including the pin holes of the three springs which is influenced substantially by the position of the grill surface against the inner surface of the panel is defined by the pin holes of the three springs already welded in advance. A location of the pin hole of one spring to be welded later and another position of the pin holes of the three springs welded previously coincide with a location of the four pins of the panel, so that the relative position of the pin holes of each of the springs is not loosed even if the four springs are not simultaneously welded to the four sides of the apertured grill.

DESCRIPTION OF THE PREFERRED EMBODIMENTS

Figure 2:
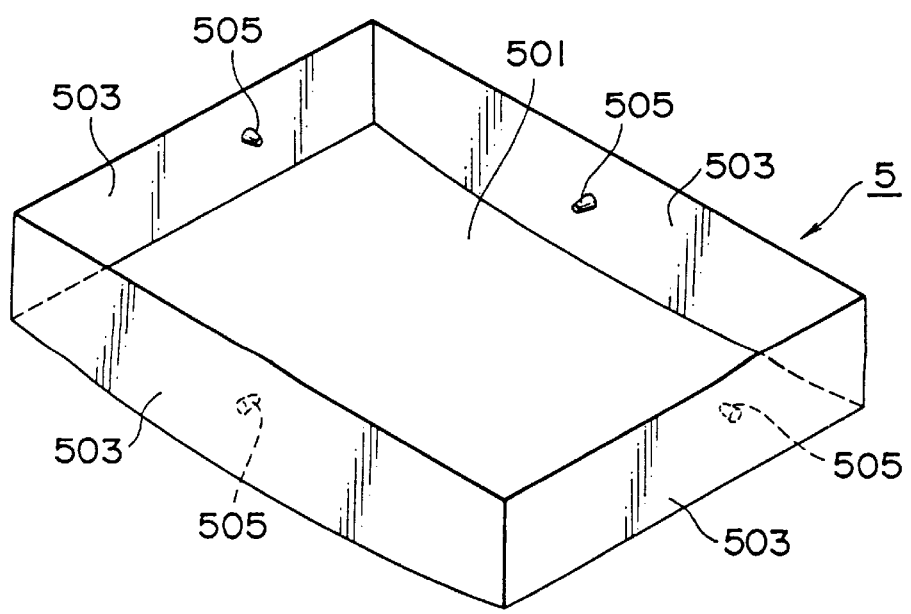
FIG. 2 is a perspective view which illustrates a rear side of the panel to which the apertured grill of FIG. 1 is fixed.

First, a construction of the panel constituting the CRT of Trinitron system and the apertured grill supported inside the panel will be described with reference to the drawings. FIG. 2 is a perspective view for showing the panel as viewed from its rear side. The panel 5 is comprised of a panel part 501 which is substantially rectangular shaped and the upper, lower, right and left skirts 503 that extend rearwardly from the four sides of the panel. The panel 501 is formed with its central part projecting more forwardly than both sides in a lateral direction. Pins 505 are fixed to the inner surfaces of the vertical and lateral skirts 503.

Figure 1:
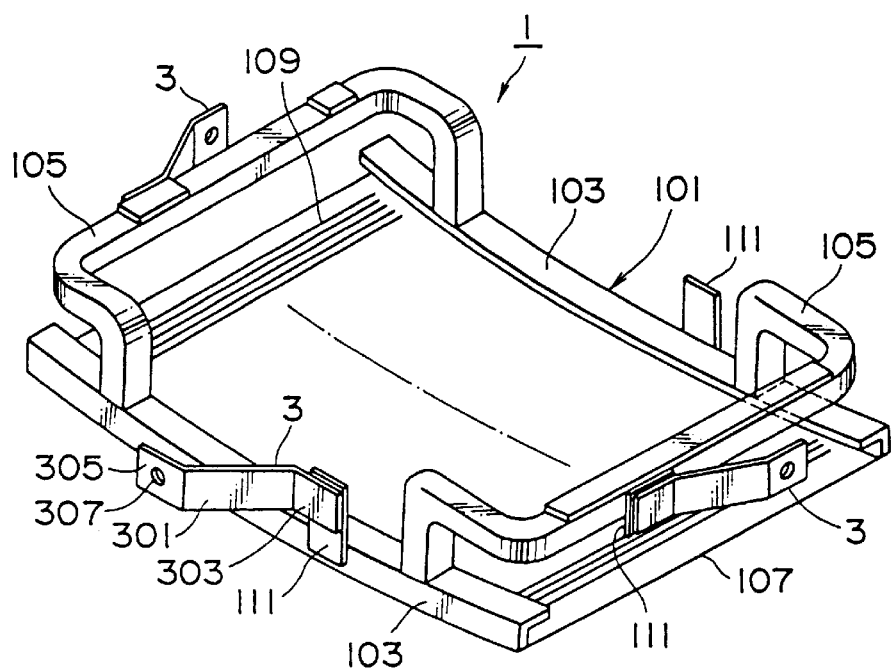
FIG. 1 is a perspective view which illustrates a rear side of the apertured grill to which the present invention is applied.

FIG. 1 is a perspective view which illustrates the apertured grill as viewed from its rear side. The apertured grill 1 is comprised of a frame 101 formed into a substantially rectangular shape which is smaller than that of the panel 501 by a factor of two. The upper and lower lateral members 103 and the right and left vertical members 105 connect between both ends of the rear surface of both lateral members 103 and a sheet-like grill 107 is tensioned and arranged between the front surfaces of the upper and lower lateral members 103 inside the frame 101.

The lateral members 103 are formed with their central portions curved to project more forwardly than those of both sides in the lateral direction so as to correspond with the panel 501. Many vertical extending slits 109 are formed in the grill 107 at locations spaced apart in the lateral direction. Each of the spring holders 111 (corresponding to the sides of the apertured grill) are welded to the outer surfaces of the vertical lateral members 103 and the lateral vertical members 105, respectively.

Figure 3:
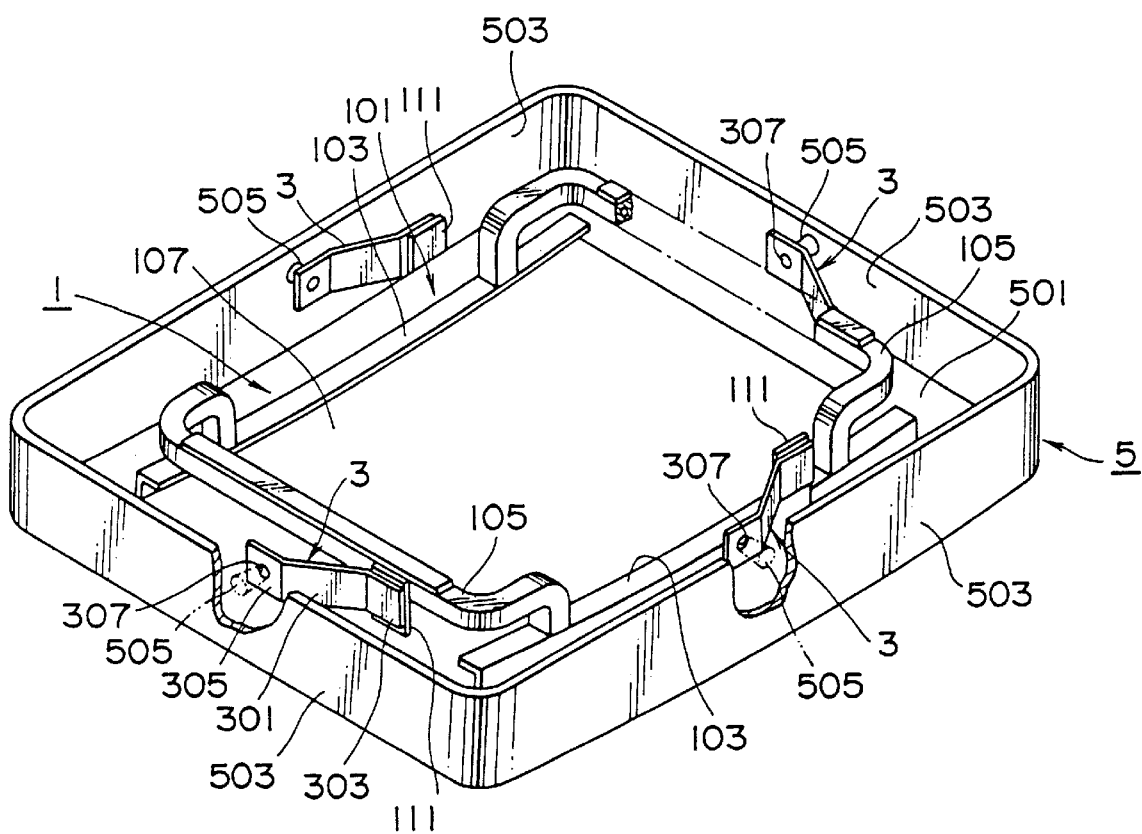
FIG. 3 is a perspective view which illustrates a state in which the apertured grill is fixed to the panel.

The apertured grill 1 is fixed to the panel 5 through engagement of the springs 3 welded to each of the spring holders 111 with the pins 505 of the panel 5. Thus, as shown in FIG. 3, the apertured grill 1 is supported inside the panel 5.

As shown in FIG. 1, the spring 3 is formed into a rectangular shape as viewed from its top by an intermediate part 301. Base parts 303 extend therefrom and are formed at both ends of the intermediate part 301 and an extremity end 305. The base parts 303 are bent at an outer surface side of the intermediate part 301, and the extremity end 305 is bent at the inner surface side of the intermediate part 301.

The base part 303 is welded to the spring holder 111 and in this state, the extremity end 305 is positioned outside each of the members 103 and 105. The extremity end 305 is formed with a pin hole 307 which can be engaged with the pin 505.

In the preferred embodiment, three of the springs 3 are already welded by a welding device not shown to the three spring holders 111 of the lower lateral member 103, the right and left vertical members 105.

These three springs 3 are constructed such that the holding pins of the welding device inserted into each of the pin holes 307, for example, are moved to the fixing positions of the pins 505 against each of the skirts 503 of the panel 5. They are moved to the location of the pin hole 307 by measuring the twistings of the panel part 501 and the grill 107. Each of the holding pins is moved to each of the lower lateral member 103, and the right and left vertical members 105. They are simultaneously welded by the three welding devices so as not to cause the positions of the pin holes 307 of the springs 3 to be displaced when each of the springs 3 is abutted against and fixed to the spring holder 111.

With such an arrangement as described above, the apertured grill 1 is constructed such that the positions of each of the pin holes 307 are aligned with the positions of the three pins 505 such that the apertured grill 1 is arranged inside the panel 5 in such a way that a space between the surface of the grill 107 and the inner surface of the panel 501 may become constant at any locations within it.

Then, the fourth spring 3 is welded by the welding device 7 of the preferred embodiment to the spring holder 111 of the upper lateral member 103 of the apertured grill 1 constructed as described above.

Figure 4:
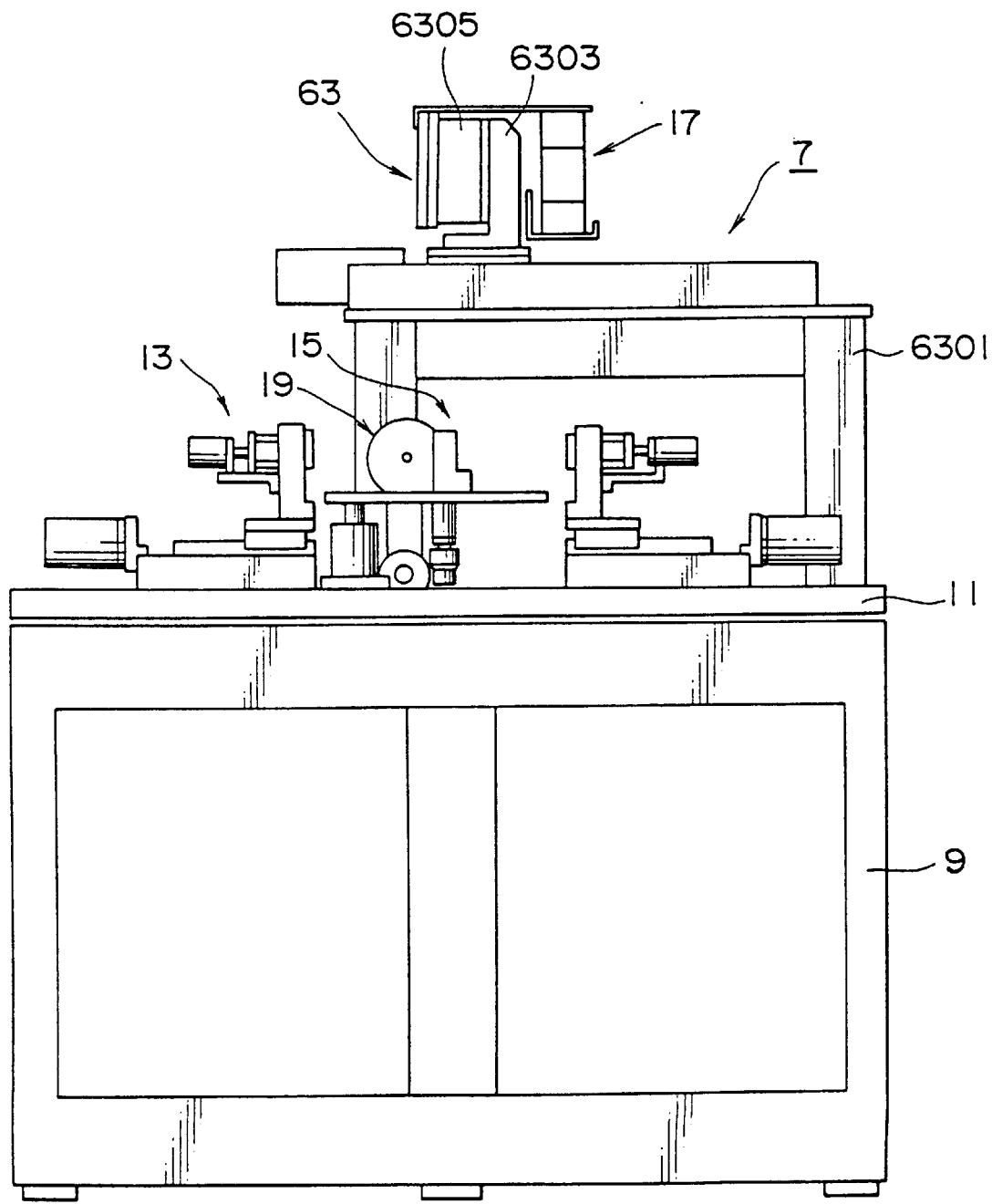
FIG. 4 is a front elevational view which illustrates a welding apparatus according to the preferred embodiment.
Figure 5:
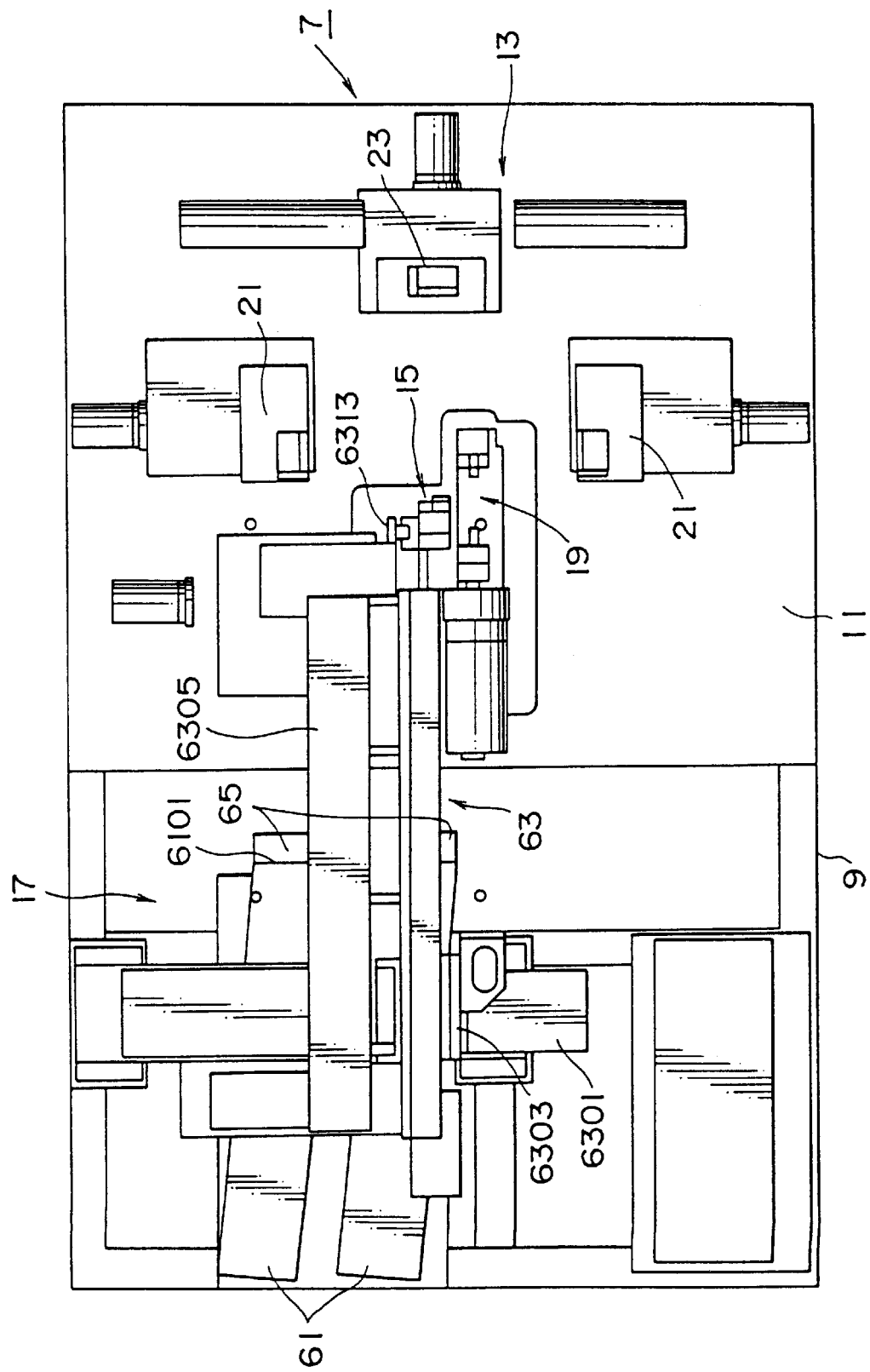
FIG. 5 is a top plan view which illustrates a welding apparatus according to the preferred embodiment.
Figure 6:
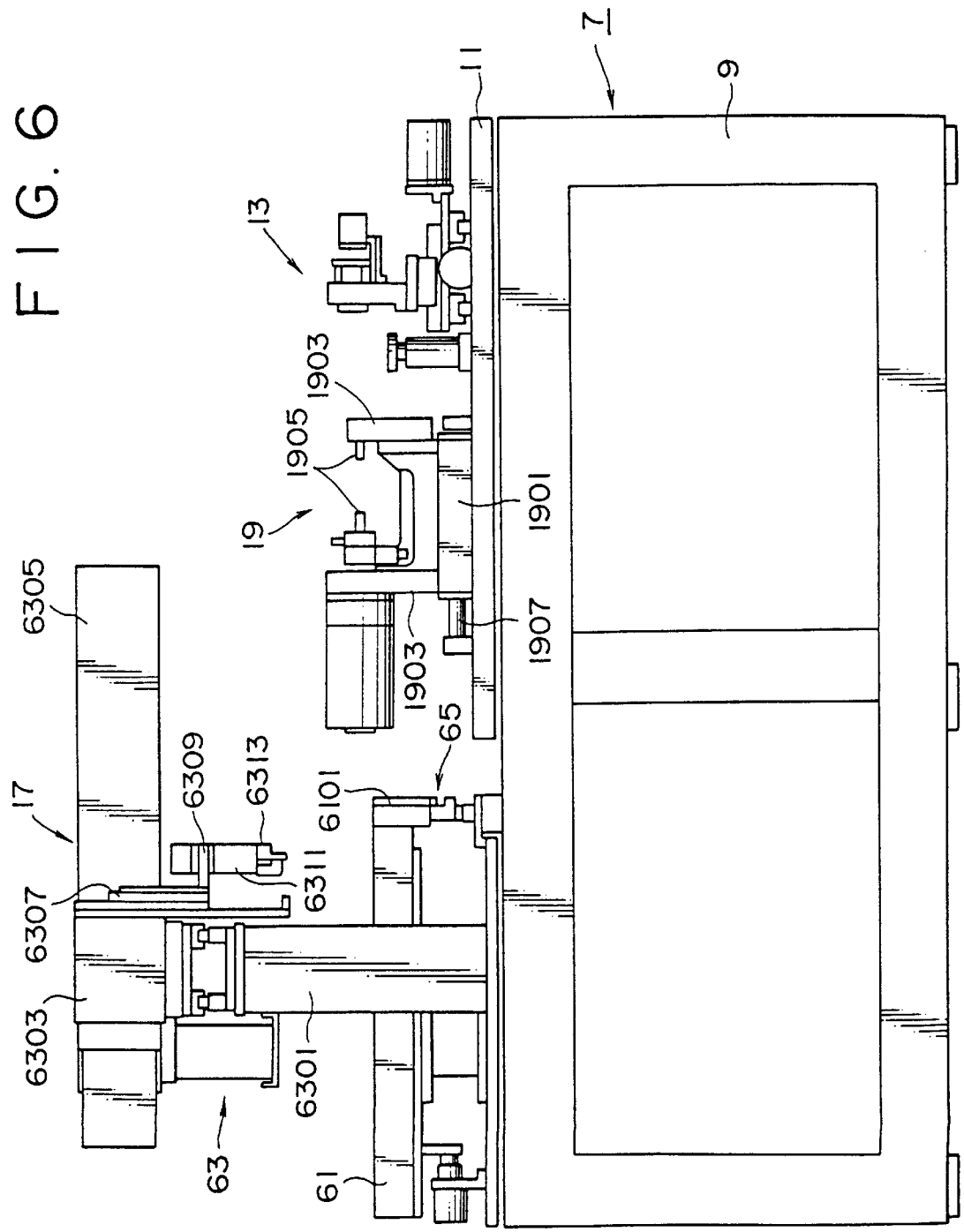
FIG. 6 is a side elevational view which illustrates a welding apparatus according to the preferred embodiment.

FIG. 4 is a front elevational view of the welding device 7 of the preferred embodiment. FIG. 5 is a top plan view of the welding device 7 and FIG. 6 is a side elevational view of the welding device 7.

The welding device 7 is comprised of a base table 9 elongated in a forward or a rearward direction and having a rectangular shape as viewed from its top. A table 11 is arranged at a front part of the upper surface of the base table 9. Apertured grill position setting supporting means (hereinafter abbreviated as supporting means) is arranged on the table 11. Spring position setting means 15 and spring supplying means 17 are arranged at a location of the base table 9 at a rear part of the table 11. Spring welding means 19 is also arranged at the rear part of the table 11.

Figure 7:
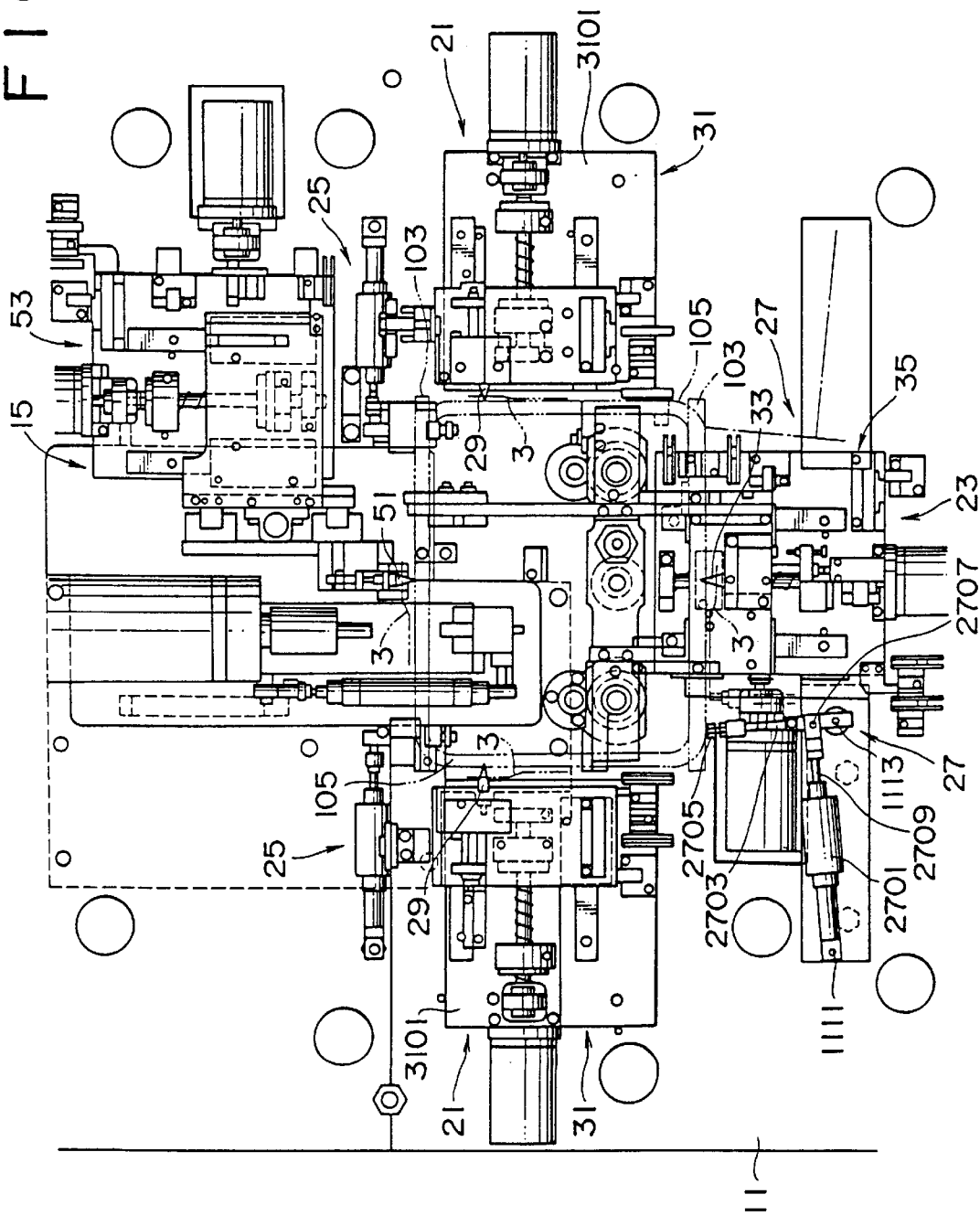
FIG. 7 is a top plan view which illustrates the table.

As shown at the top plan view of the table 11 in FIG. 7, the supporting means 13 is comprised of two spring supporting parts 21 for position setting and supporting each of the right and left vertical members 105 through the springs 3. One spring supporting part 23 is used for position setting and supporting the lower lateral member 103. Two upper fixing parts 25 are used for fixing both right and left locations of the upper part of the apertured grill 1. Two lower fixing parts 27 are used for fixing both right and left locations of the lower part of the apertured grill 1.

The spring supporting parts 21 are comprised of pins 29 engageable with the pin holes 307 of the springs 3. A moving mechanism 31 is used for moving the pins 29 in a direction away from or moving toward the vertical member 105.

Figure 8:
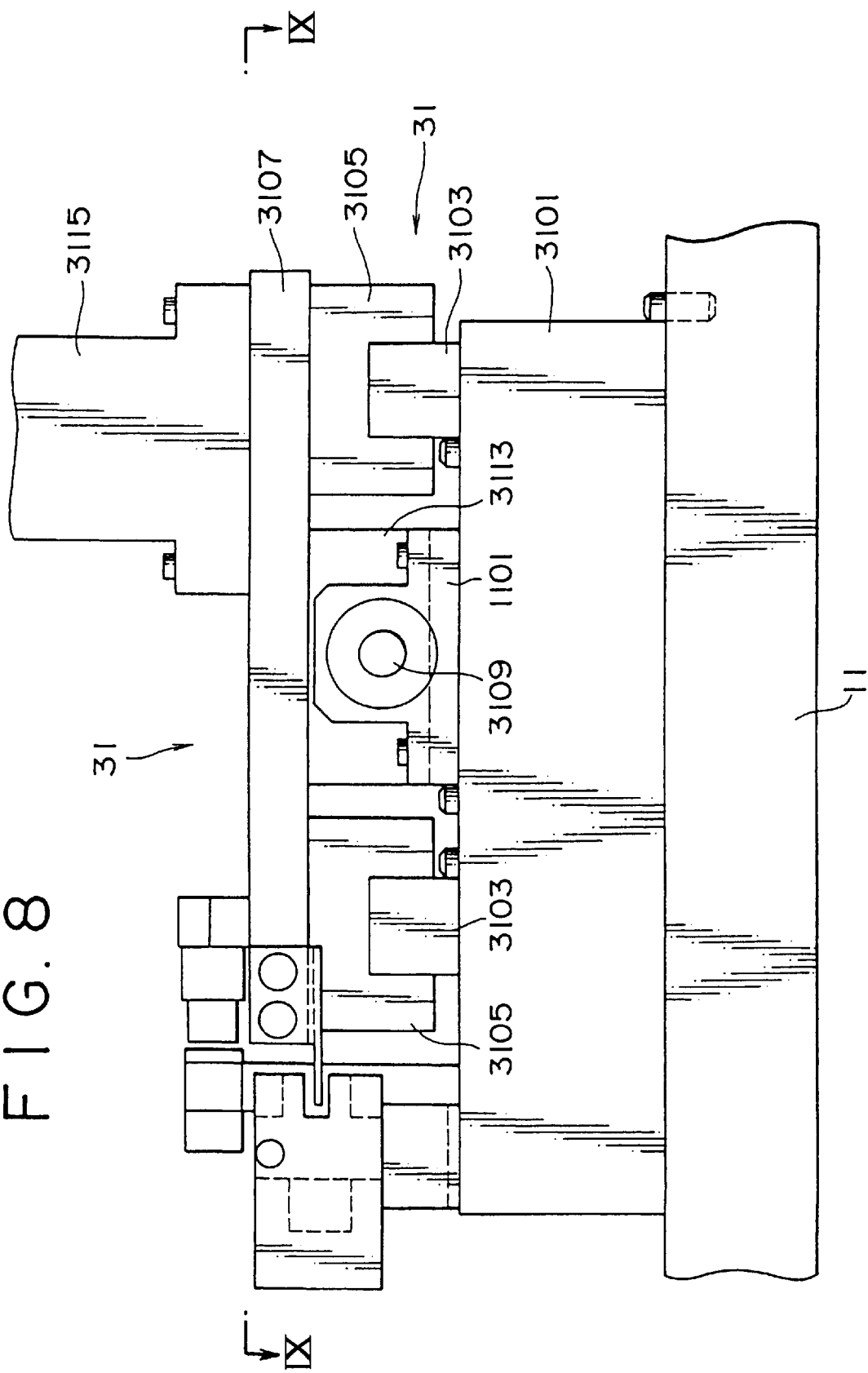
FIG. 8 is a side elevational view which illustrates a moving mechanism for the pins of the right and left vertical members.

FIG. 8 is a side elevational view of the moving mechanism 31. The moving mechanism 31 is comprised of a base plate 3101 mounted on the table 11. A moving plate 3107 is movably supported on the base plate 3101 in a direction moving away from or toward the vertical members 105 through the guide rails 3103 and the sliders 3105. A screw shaft 3109 is supported on the table 11 through the bearings 1101 in such a way that it may be rotated and may not be moved axially. A motor 3111 is used for rotating the screw shaft 3109 (refer to FIG. 9). A moving member 3113 is threadably attached to the screw shaft 3109 and supports the sliders 3105. The pin 29 projects at a supporting column 3115 vertically arranged on the sliders 3105.

The moving mechanism 31 is constructed such that the moving plate 3107 is moved through the moving member 3113 under a rotational driving of the motor 3111 and the pins 29 are engaged with or disengaged from the pin holes 307.

Figure 9:
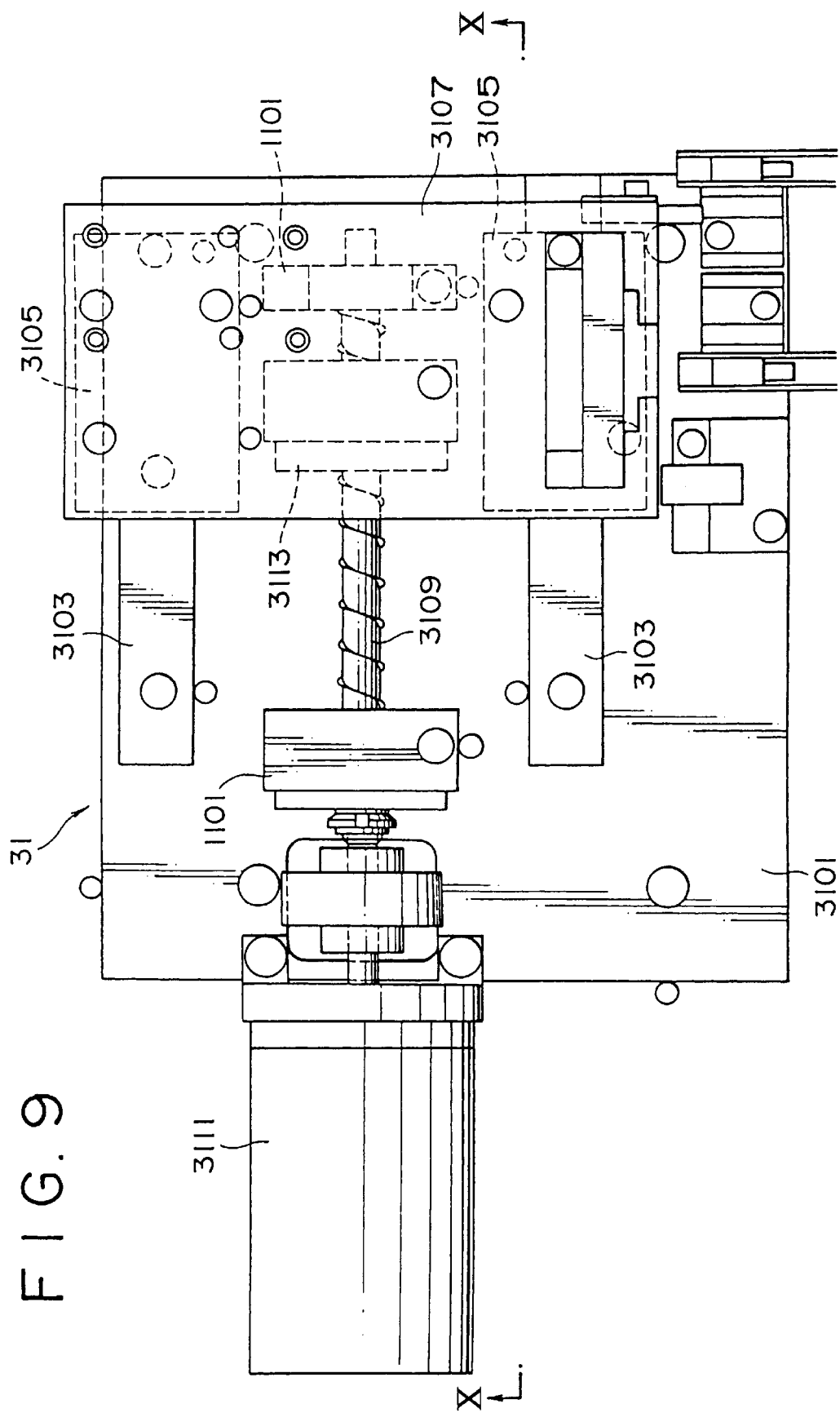
FIG. 9 is a view taken along an arrow A.
Figure 10:
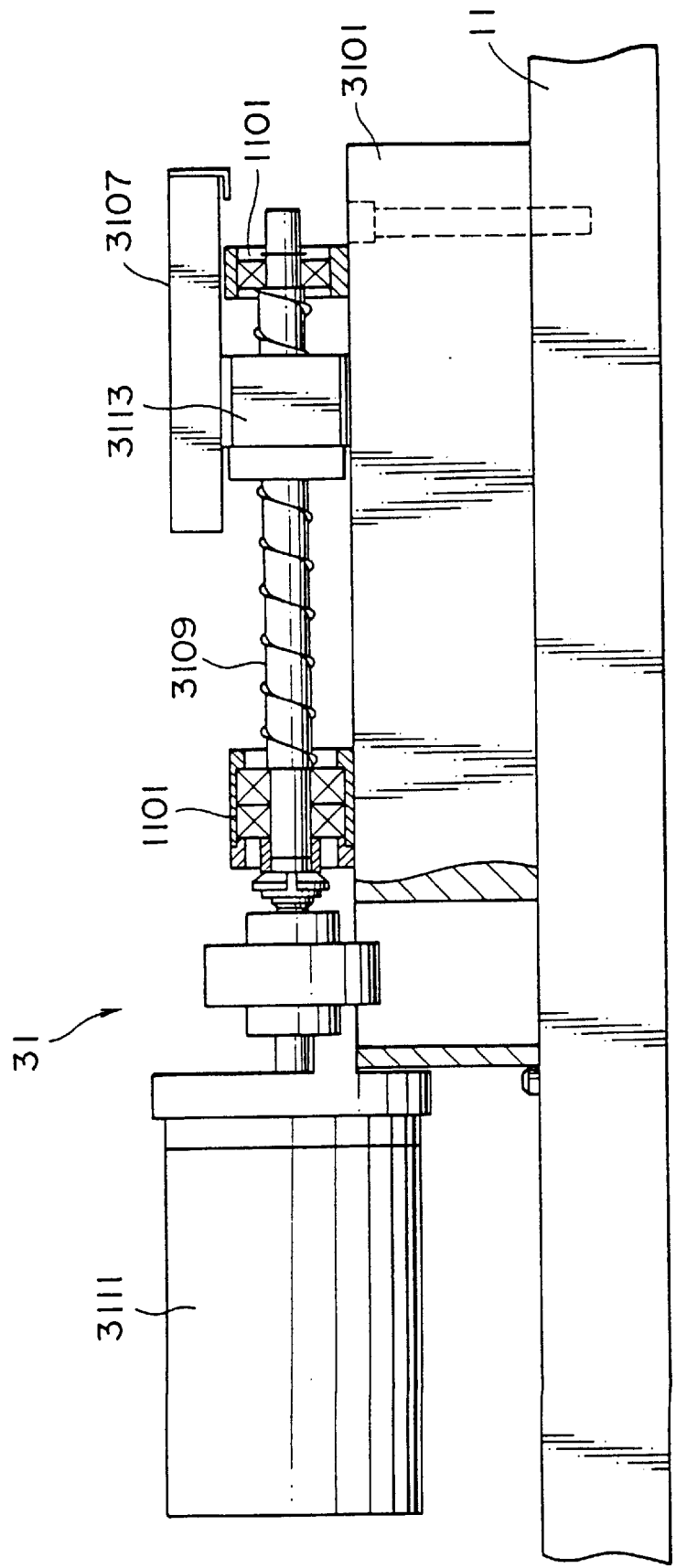
FIG. 10 is a view taken along an arrow B.

FIG. 9 is a view taken along an arrow A in FIG. 8, and FIG. 10 is a view taken along an arrow B in FIG. 9.

As shown in FIG. 7, the spring supporting part 23 is comprised of the pin 33 engageable with the pin hole 307 of the spring 3 of the lower lateral member 103. Additionally, it is comprised of the moving mechanism 35 for moving the pin 33. The moving mechanism 35 is comprised of, as shown in the side elevational view in FIG. 11, a rightward or leftward moving mechanism 37 for moving the pin 33 along a longitudinal direction of the lower lateral member 103 and a forward or rearward-moving mechanism 39 for moving the pin 33 in a direction away from and toward the spring 3.

The rightward or leftward moving mechanism 37 is comprised of an intermediate moving plate 3705 movably supported along a longitudinal direction of the lower lateral member 103 through the guide rails 3701 and the sliders 3703 on the table 11. A screw shaft 3707 is supported on the table 11 through the bearing 1103 in such a way that it may be rotated and not moved axially. A motor 3709 rotates the screw shaft 3707 (refer to FIG. 12). A moving member 3711 is threadedly attached to the screw shaft 3707 for supporting the intermediate moving plate 3705.

The rightward or leftward moving mechanism 37 is constructed such that the intermediate moving plate 3705 is moved along the longitudinal direction of the lower lateral member 103 through the moving member 3711 under rotational driving of the motor 3709.

Figure 11:
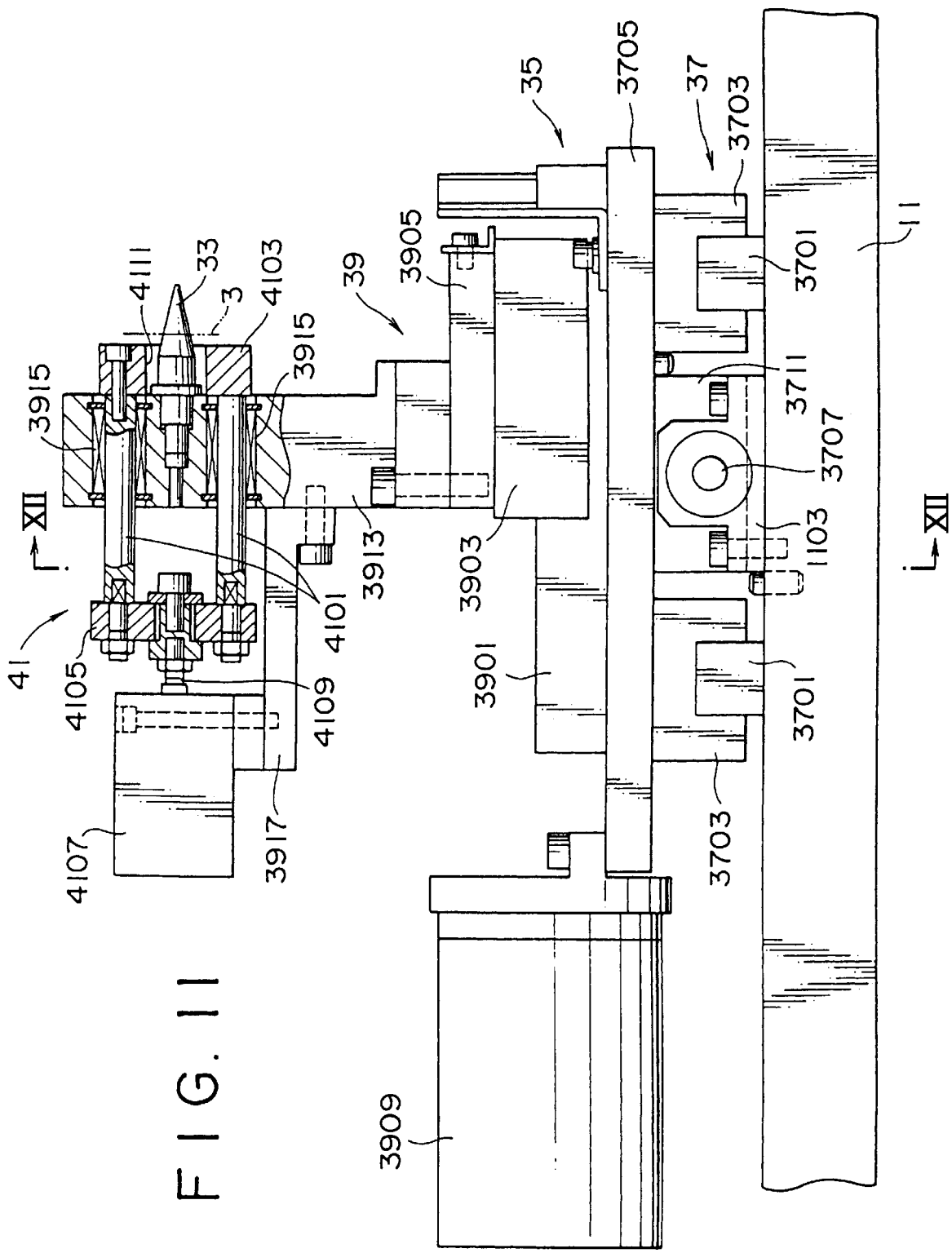
FIG. 11 is a side elevational view which illustrates a moving mechanism for a pin of a lower lateral member.
Figure 12:
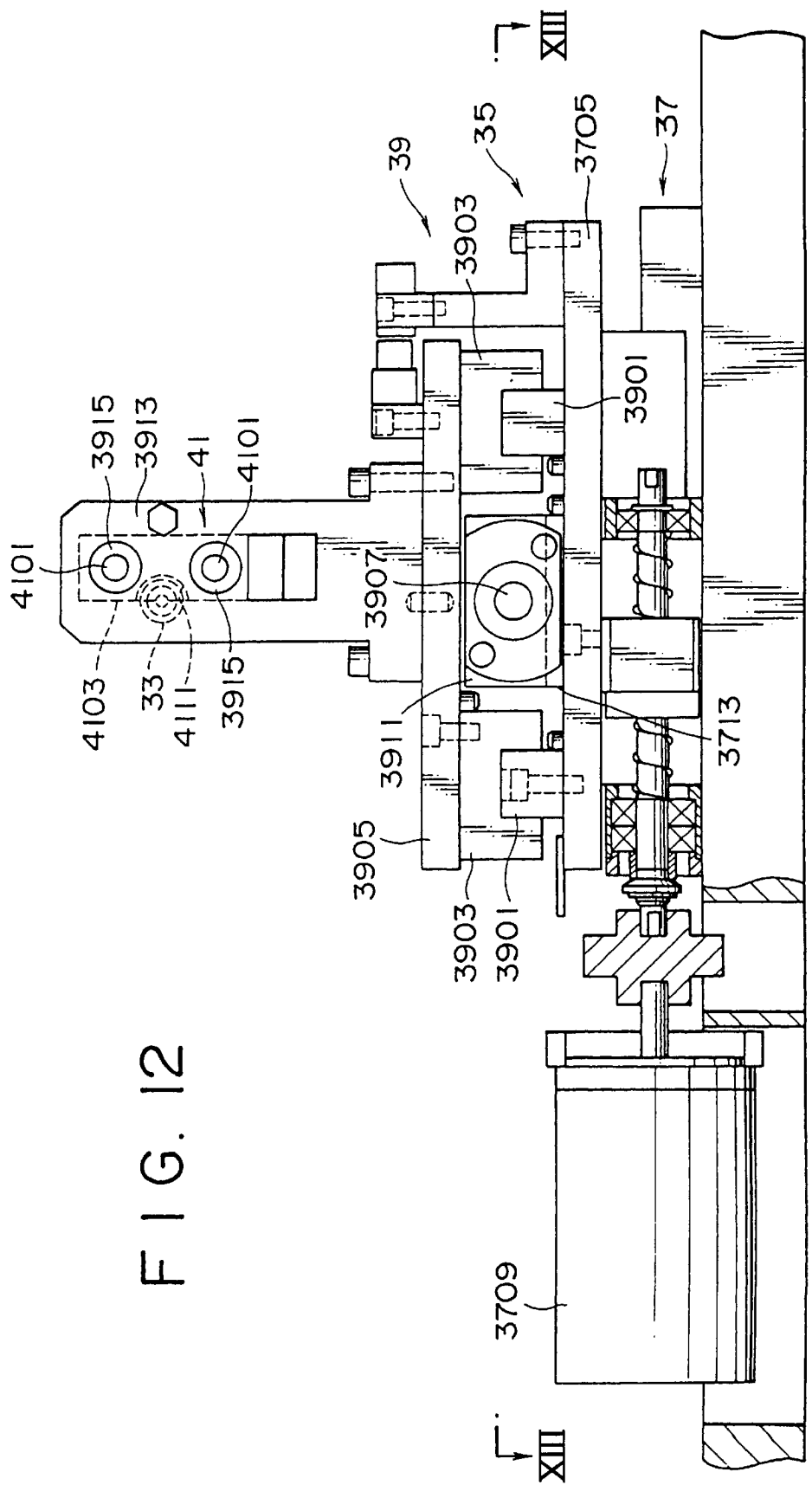
FIG. 12 is a view taken along an arrow C in FIG. 11.

FIG. 12 is a view taken along an arrow C in FIG. 11. As shown in FIG. 12, the forward or rearward moving mechanism 39 is comprised of a moving plate 3905 supported on the intermediate moving plate 3705 in such a way that it may be moved in a direction moving away from or toward the spring 3 through the guide rails 3901 and the sliders 3903. A screw shaft 3907 is supported on the intermediate moving plate 3705 through a bearing 3713 in such a way that it may be rotated and may not be moved axially. A motor 3909 rotates the screw shaft 3907 (refer to FIG. 11). A moving member 3911 is threadedly attached to the screw shaft 3907 for supporting the moving plate 3905. The pin 33 projects at a supporting column 3913 vertically arranged on the moving plate 3905.

The forward or rearward moving mechanism 39 is constructed such that the pin 33 is moved in a direction away from or toward the spring 3 through the moving member 3911 as well as the moving plate 3905 and the supporting column 3913. It is engaged with or disengaged from the pin hole 307 under rotational driving of the motor 3909.

In the preferred embodiment, the spring supporting part 23 is provided with a spring disengaging mechanism 41. As shown in FIG. 11, the spring disengaging mechanism 41 is comprised of two guide rods 4101 inserted into each of the bearings 3915 at vertical spaced-apart locations in the upper part of the supporting column 3913. Spring pressing members 4103 are arranged between the end portions of both guide rods 4101 and project at the side where the pin 33 projects from the supporting column 3913. Connecting members 4105 connect between the end portions of both guide rods 4101 and project at a side opposite to the side where the pin 33 is projected from the supporting column 3913. A cylinder 4107 is supported at the supporting column 3913 through a bracket 3917.

The extremity end of a piston rod 4109 of the cylinder 4107 is connected to the connector member 4105, and one side of the spring pressing member 4103 is formed with a groove 4111 for preventing interference with the pin 33. The spring disengaging mechanism 41 is constructed such that the spring pressing member 4103 moves away from the supporting column 3913 under an extending operation of the cylinder 4107 so as to press the spring 3 engaged with the pin 33 and to cause the spring 3 to be disengaged from the pin 33.

The supporting column 3115 of the spring supporting part 21 is also provided with a spring disengaging mechanism (not shown) similar to the spring disengaging mechanism 41.

In the preferred embodiment, the pins 29, 33 correspond to the first three position setting pins. The moving mechanism 31 and the forward or rearward moving mechanism 39 correspond to the first disengaging moving mechanism, and the rightward or leftward moving mechanism 37 corresponds to the first position adjusting moving mechanism.

Figure 13:
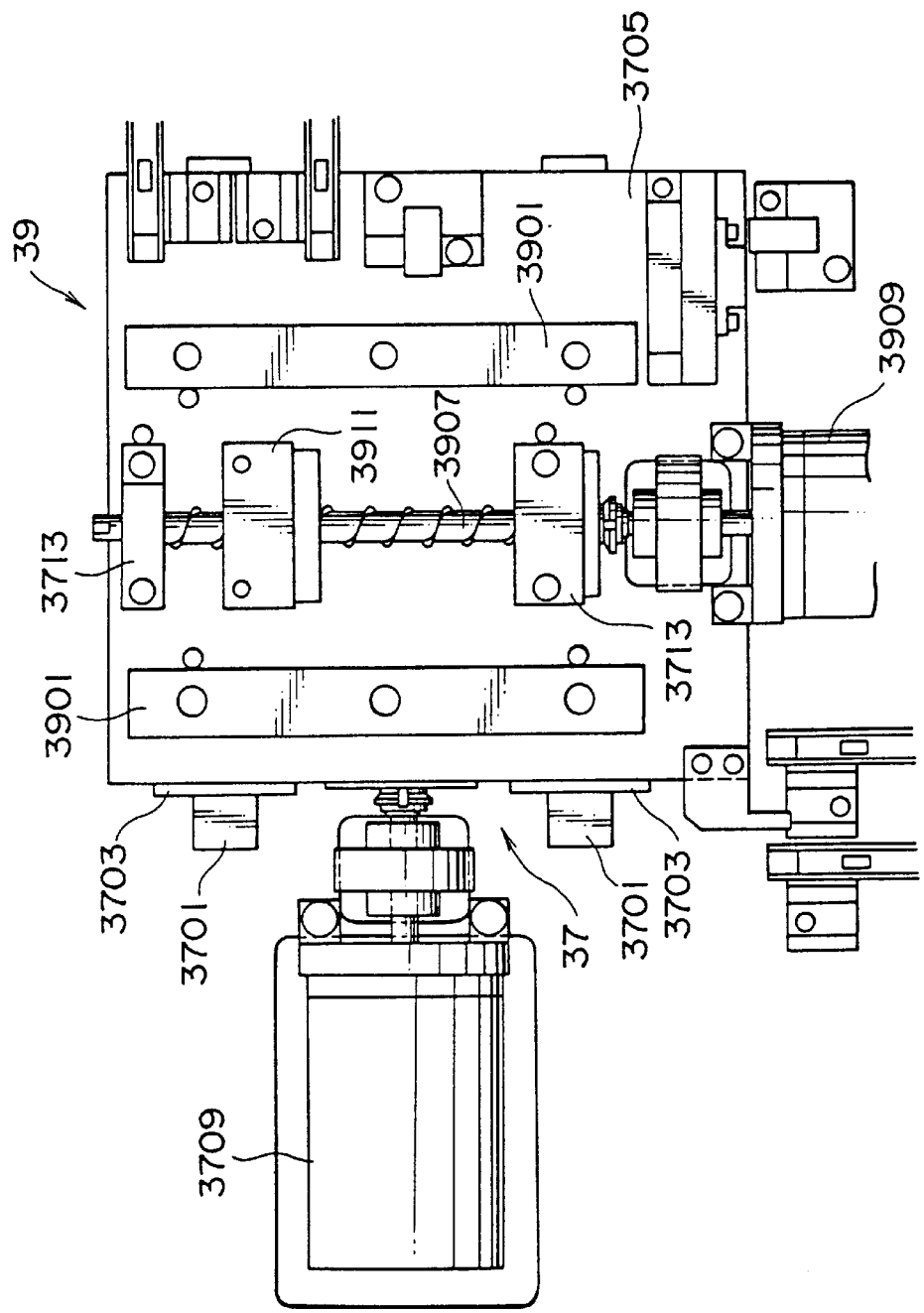
FIG. 13 is a view taken along an arrow D in FIG. 11.

FIG. 13 is a view taken along an arrow D in FIG. 12.

Figure 14:
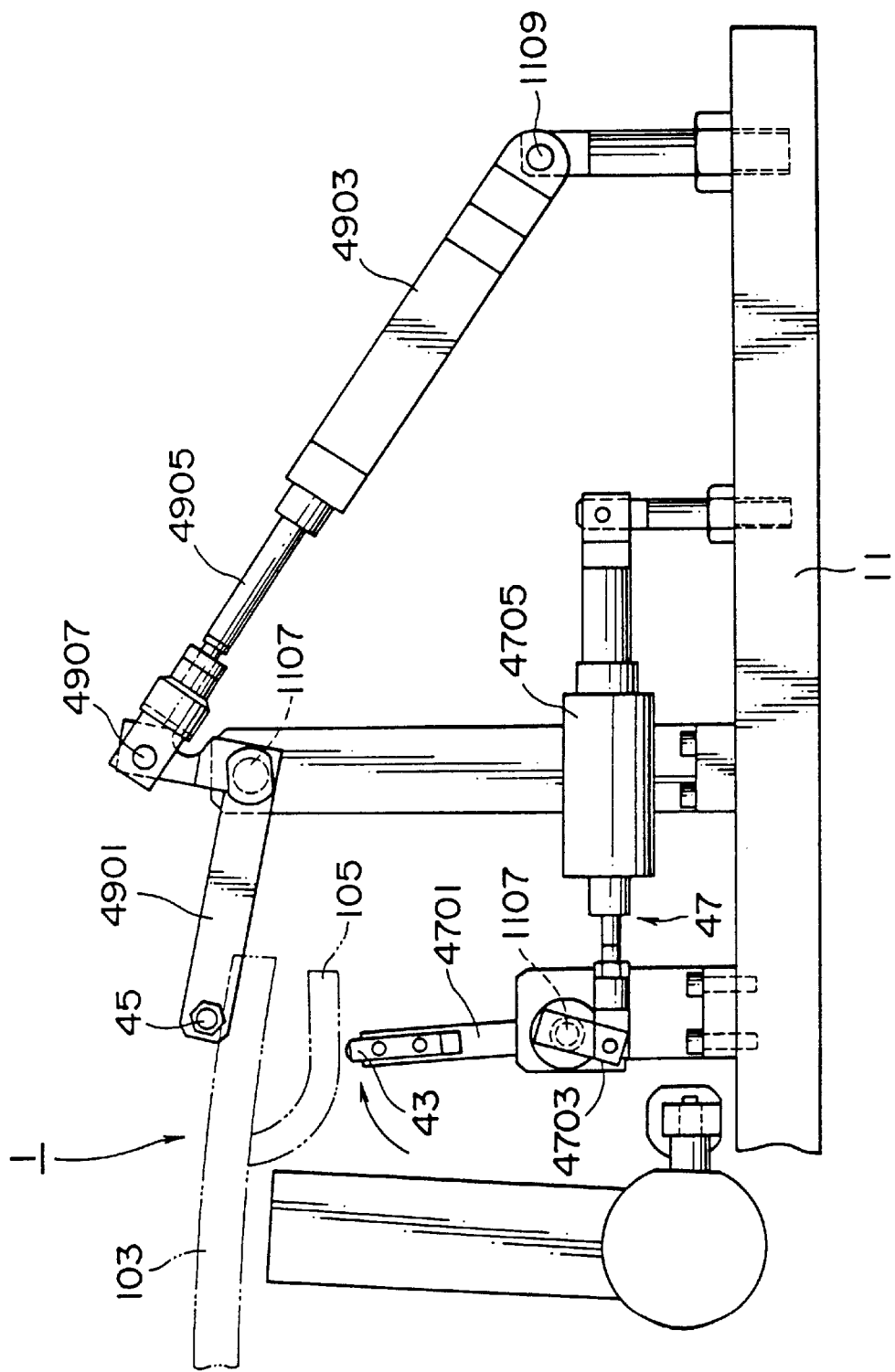
FIG. 14 is a front elevational view of an upper fixed part.

As shown in FIG. 14, the upper fixing part 25 is comprised of rear pressing members 43 engageable with rear surfaces near both upper ends of the right and left vertical members 105. Front pressing members 45 are engageable with front surfaces of locations near both right and left ends of the upper lateral member 103. Driving mechanisms 47, 49 cause each of the pressing members 43, 45 to be engaged with or disengaged from each of the members 103, 105.

A driving mechanism 47 for the rear pressing members 43 is comprised of an oscillating arm 4701 which can be oscillated around a horizontal shaft 1105 supported by the table 11. A lock-up cylinder 4705 is connected to the horizontal shaft 1105 through a link 4703. The rear pressing members 43 are fixed to the extremity end of the oscillating arm 4701.

The rear pressing members 43 abut, at their extremity ends, against a rear surface of the vertical member 105 by oscillating the oscillating arm 4701 upwardly through the link 4703 and the horizontal shaft 1105 under an extending operation of the lock-up cylinder 4705. The driving mechanism 47 is constructed such that the lock cylinder 4705 is locked when the rear pressing members 43 abut against a rear surface of the vertical member 105 and then the rear pressing members 43 are fixed.

A driving mechanism 49 for the front pressing members 45 is comprised of an oscillating arm 4901 having a substantial L-shape and rotatable around a horizontal shaft 1107 where its intermediate part is supported by the table 11. A cylinder 4903 has its base end rotatably supported around the horizontal shaft 1109 on the table 11.

An extremity end of the piston rod 4905 of the cylinder 4903 is rotatably connected to one end of the oscillating arm 4901 through a pin 4907. The front pressing members 45 are fixed to the other end of the oscillating arm 4901.

The driving mechanism 49 is constructed such that the front pressing members 45 abut against a front surface of the lower lateral member 103 so as to hold the apertured grill 1 together with the rear pressing members 43 by oscillating the oscillating arm 4901 so as to cause the other end to approach the table 11 under an extending operation of the piston rod 4905. This occurs under a state in which the extremity ends of the rear pressing members 43 are abutted against and fixed to the rear surfaces of the vertical member 105. At this time, the location near the other end of the oscillating arm 4901 is abutted against an outer surface of the lower lateral member 103.

As shown in FIG. 7, the lower fixing part 27 is comprised of a lock-up cylinder 2701 supported to be oscillatable within a horizontal plane around a shaft 1111 projected on the table 11. An oscillating arm 2703 has its base end oscillatably supported within a horizontal plane around a shaft 1113 projected on the table 11. Pressing members 2705 are fixed to the extremity end of the oscillating arm 2703 and can be abutted against each of the outer surfaces near both right and left ends of the lower lateral member 103, The location near the base end of the oscillating arm 2703 is rotatably connected to an extremity end of the piston rod 2709 of the lock-up cylinder 2701 through a pin 2707.

The lower fixing part 27 is constructed such that the pressing member 2705 approaches from the outside part of the apertured grill 1 to the upper lateral member 103 under oscillation of the horizontal oscillating arm 2703 through an extending operation of the lock-up cylinder 2701. This abuts against each of its outer surfaces, and at this time, the extending operation of the lock-up cylinder 2701 is stopped and the oscillating arm 2703 is locked in such a way that its oscillation cannot be carried out.

The spring position setting means 15 is operated to abut and position set the spring 3 against the spring holder 111 of the upper lateral member 103 under a state in which the apertured grill 1 is fixed with the spring supporting parts 21, 23, as shown in FIG. 3. This spring position setting means is comprised of a pin 51 (corresponding to the fourth position setting pin) engageable with a pin hole 307 of the spring 3, and a moving mechanism 53 for moving the pin 51.

Figure 15:
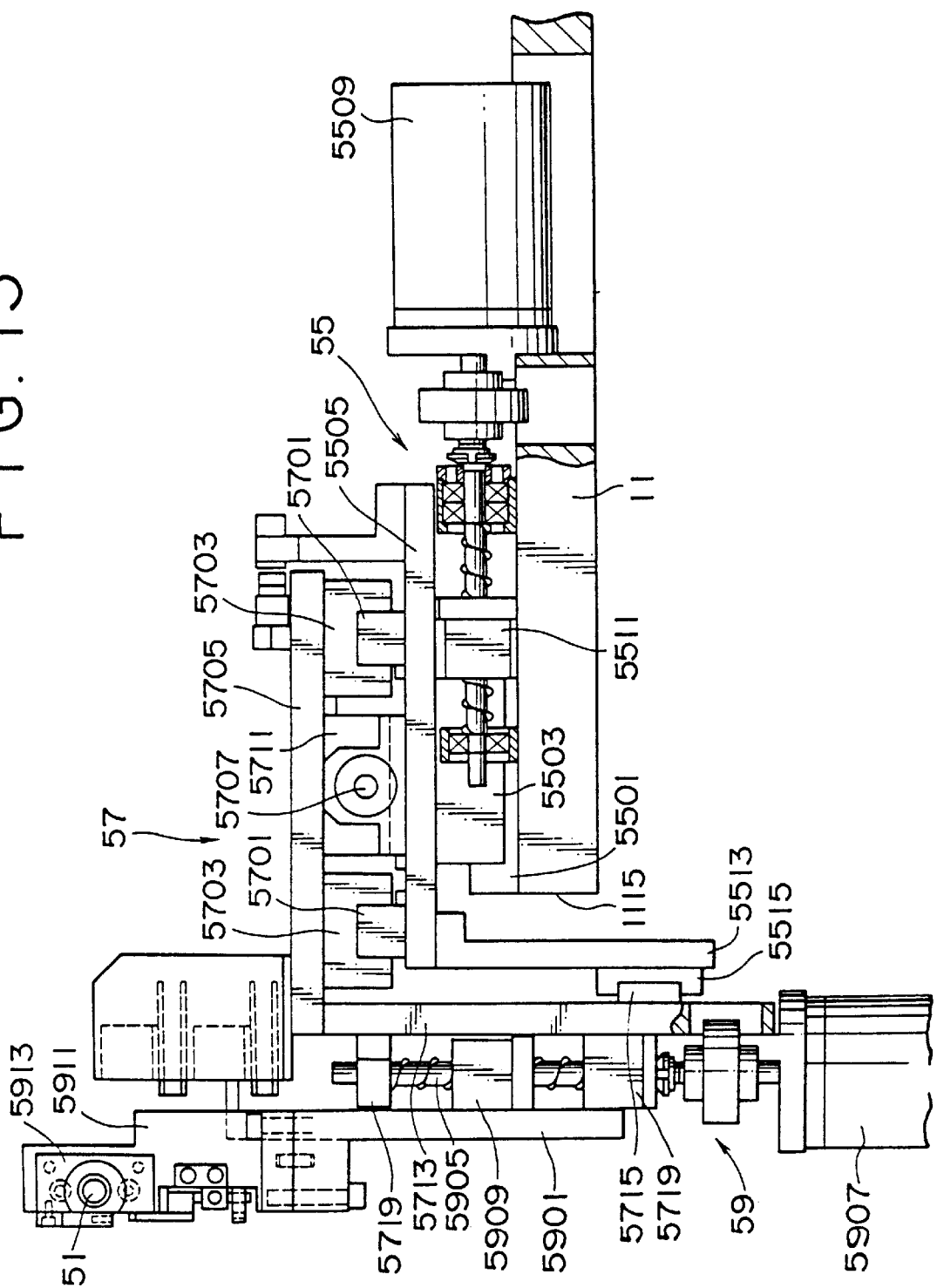
FIG. 15 is a side elevational view which illustrates a moving mechanism for the pin of the spring position setting means.

As shown in the side elevational view of FIG. 15, the moving mechanism 53 is comprised of a lateral moving mechanism 55 for moving the pin 51 along a longitudinal direction of the upper lateral member 103. A forward or rearward moving mechanism 57 moves the pin 51 in a direction away from or toward the spring 3. An ascending or descending moving mechanism 59 ascends or descends the pin 51 on the table 11. The lateral moving mechanism 55 and the ascending or descending mechanism 59 correspond to the second position adjusting moving mechanism and the forward or rearward moving mechanism 57 correspond to the second engaging or disengaging moving mechanism.

The lateral moving mechanism 55 is comprised of a guide rail 5501, a slider 5503, the first intermediate moving plate 5505, a screw shaft 5507, a motor 5509, and a moving member 5111. Further, the lateral moving mechanism 55 is constructed such that the first intermediate moving plate 5505 moves along a longitudinal direction of the upper lateral member 103 on the table 11 through the moving member 5511 under rotational driving of the motor 5509 in the same manner as that of the aforesaid lateral moving mechanism 37.

In FIG. 15, reference numeral 1115 denotes a slit formed in the table 1115 and reference numeral 5513 denotes a guide plate vertically arranged downward from the rear end of the first intermediate moving plate 5505. An extremity end of the guide plate 5513 is inserted into the slit 1115.

The forward or rearward moving mechanism 57 is comprised of a guide rail 5701, a slider 5703, the second intermediate moving plate 5705, a screw shaft 5707, a motor 5709 (refer to FIG. 16) and a moving member 5711. It is constructed such that the second intermediate moving plate 5705 is moved in a direction away from or toward the upper lateral member 103 on the first intermediate moving plate 5503 through the moving member 5711 under a rotational driving of the motor 5709 substantially in the same manner as that of the forward or rearward moving mechanism 39.

In FIG. 15, reference numeral 5713 denotes a guide plate vertically arranged downward from the rear end of the second intermediate moving plate 5705. An extremity end of the guide plate 5713 is inserted into the slit 1115. A guide rail 5715 is fixed to the lower part of the guide plate 5713, and a slider 5515 sliding on the guide rail 5715 is fixed to the lower part of the guide plate 5513.

Figure 16:
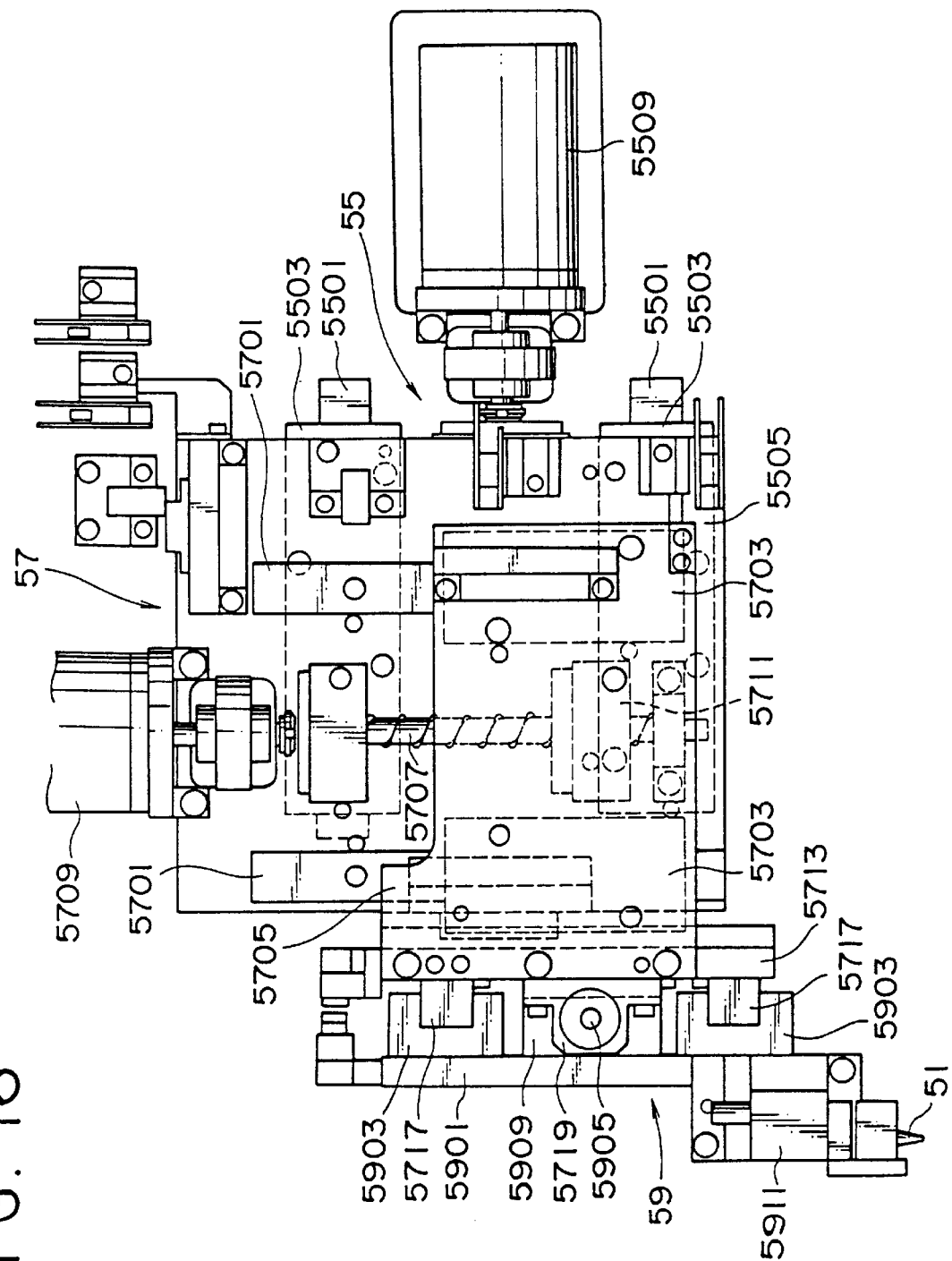
FIG. 16 is a top plan view which illustrates the moving mechanism shown in FIG. 15.

As shown in FIG. 16, the ascending or descending mechanism 59 is comprised of an ascending or descending plate 5901 arranged to be opposite against the guide plate 5713. A slider 5903 is attached to the ascending or descending plate 5901 and is slidable on the guide rail 5717 of the guide plate 5713. A screw shaft 5905 is supported on the guide plate 5713 through a bearing 5719 in such a way that it may be rotated and may not be moved axially. A motor 5907 rotates the screw shaft 5905 (refer to FIG. 15). An ascending or descending member 5909 is threadably attached to the screw shaft 5905 and is connected to the ascending or descending plate 5901. The pin 51 projects at a supporting column 5911.vertically arranged on the ascending or descending plate 5901.

The ascending or descending moving mechanism 59 is constructed such that the pin 51 ascends or descends through the ascending or descending member 5909 and the ascending or descending plate 5901 under rotational driving of the motor 5907.

Figure 17:
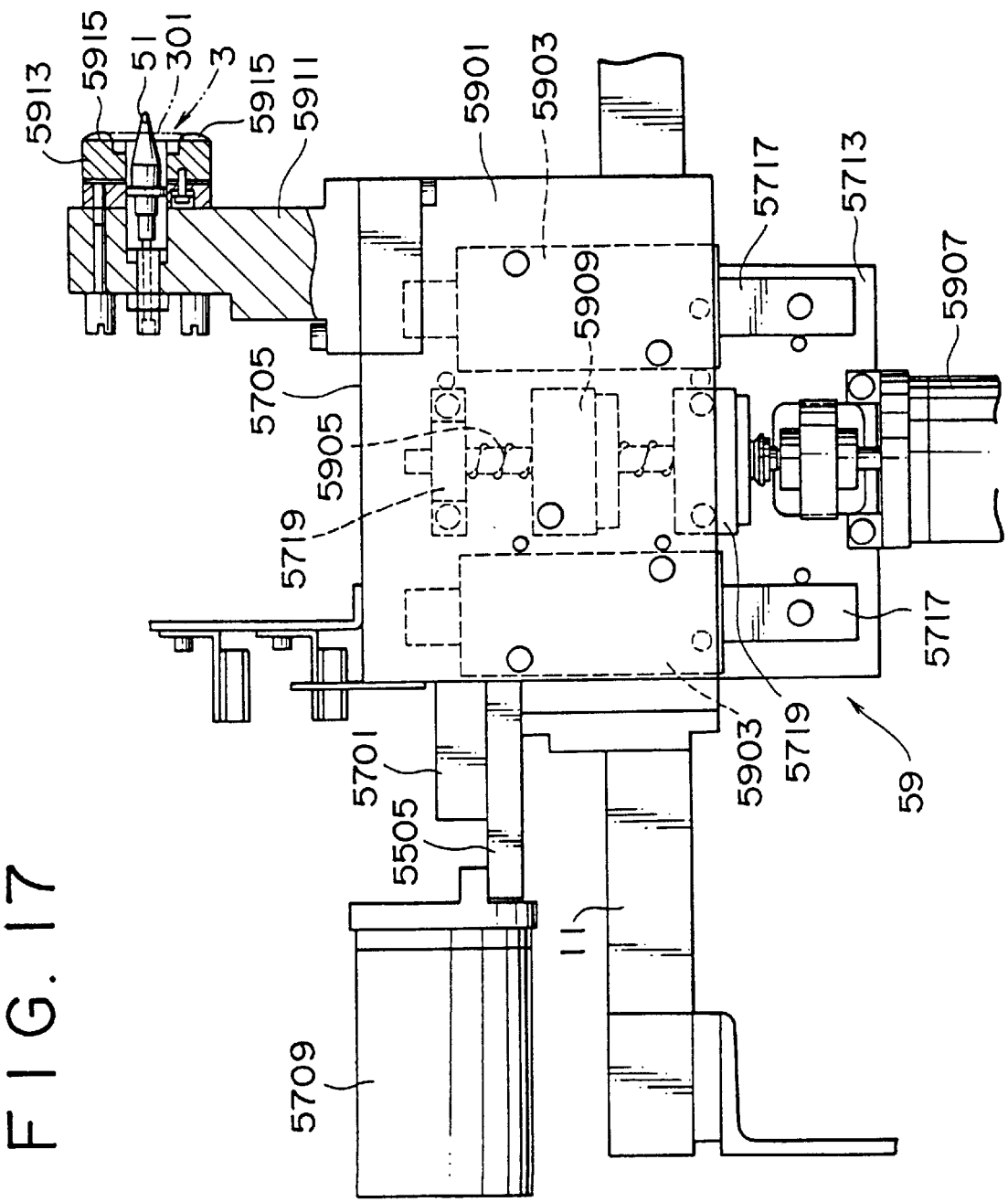
FIG. 17 is a front elevational view which illustrates the moving mechanism shown in FIG. 15.

FIG. 17 is a front elevational view for showing the moving mechanism 53. In FIG. 17, the moving mechanism is constructed such that reference numeral 5913 denotes a magnet fixed to a location of the supporting column 5911 around the pin 51. Each of the projections 5915 is formed at an upper location and a lower location of the pin 51 at the extremity end surface of the magnet 5913, respectively. The magnet 5913 contacts with an intermediate part 301 of the spring 3 when the pin 51 is engaged with the pin hole 307, and both projections 5915 are engaged with both upper and lower edges of the intermediate part 301, respectively.

As shown in FIGS. 5 and 6, the spring supplying means 17 is comprised of magazines 61 for storing many springs 3. A delivering mechanism 63 delivers the springs 3 from the magazines 61 to the pin 51 of the spring position setting means 15.

Figure 18:
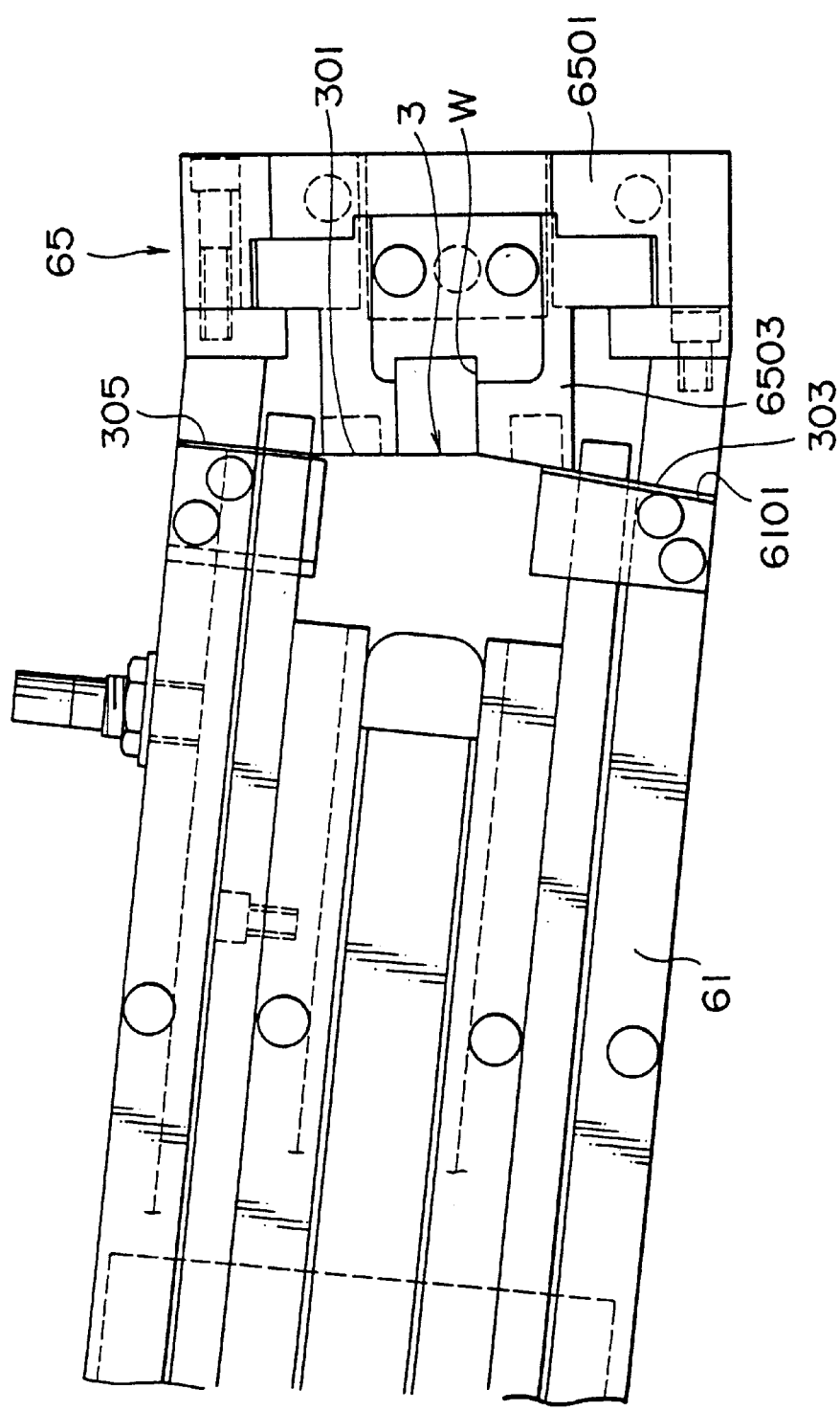
FIG. 18 is a top plan view which illustrates magazines and a taking-out mechanism.

Two rows of the magazines 61 are arranged and as shown in FIG. 18. A front end taking-out port 6101 of each of the magazines 61 is provided with a taking-out mechanism 65 for taking out the springs 3 one by one from the magazines 61.

The taking-out mechanism 65 is comprised of an ascending or descending block 6501 to be ascended or descended by an ascending or descending driving source not shown and a magnet 6503 fixed to the ascending or descending block 6501. An extremity end surface of the magnet 6503 is formed with a groove 6505.

The taking-out mechanism 65 is constructed such that the spring 3 is magnetically attached to the magnet 6503 by positioning the ascending or descending block 6501 at the taking-out port 6101. The ascending or descending block 6501 is lifted up from this state to cause a stepped part (not shown) of the ascending or descending block 6501 to be engaged with the lower edge of the intermediate part 301 of the spring 3. The spring 3 at the taking-out port 6101 is pulled up and taken out of the magazine 61.

As shown in FIGS. 5 and 6, the delivering mechanism 63 is comprised of a supporting frame 6301 vertically arranged on a base block 9 and extending in the lateral direction of the base block 9. A moving member 6303 is supported on the supporting frame 6301 and movable in a lateral direction of the base block 9. A guide arm 6305 extends from the moving member 6303 toward a front part of the base block 9.

In addition, the delivering mechanism 63 is comprised of a moving frame 6307 supported by the guide arm 6305 and movable in a forward or rearward direction of the base block 9. An ascending or descending frame 6309 is supported at the moving frame 6307 in such a way that it may be ascended or descended. A rotary actuator 6311 is supported by the ascending or descending frame 6309 and rotatable within a horizontal plane. A chuck 6313 is supported at the lower end of the rotary actuator 6311, and driving of the delivering mechanism 63 is carried out by a driving source not shown.

Figure 19:
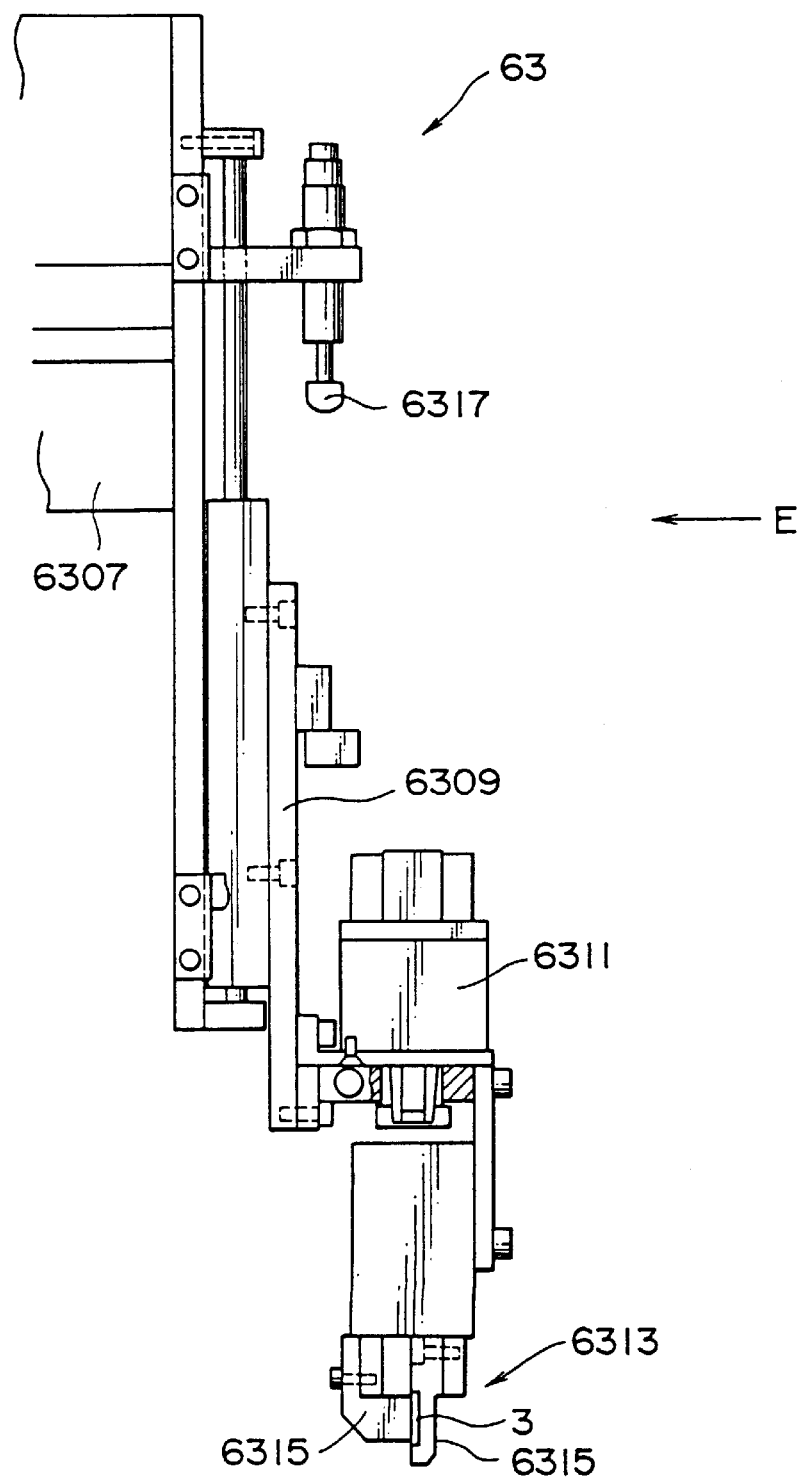
FIG. 19 is a side elevational view which illustrates a substantial part of a delivering mechanism.

FIG. 19 is a side elevational view for showing a substantial part of the delivering mechanism 63. The chuck 6313 is comprised of a pair of chuck pieces 6315 which can be opened or closed.

One of the chuck pieces 6315 is formed to have a size such that it can be inserted into a space W between the spring 3 which is magnetically attached to the magnet 6503 and the groove 6505. The reference numeral 6317 in FIG. 19 denotes a stopper engageable with the ascending or descending frame 6309 and an upper limit position of the ascending or descending frame 6309 is determined by the stopper 6317.

The delivering mechanism 63 is constructed such that the chuck 6313 can be reciprocated alternatively between the taking-out port 6101 of each of the magazines 61 and the pin 51 of the spring position setting means 15 under operation of the moving member 6303, the moving frame 6307 and the ascending or descending frame 6309. An orientation of the chuck 6313 can be changed to any optional orientation under rotation of the rotary actuator 6311.

In addition, it is constructed such that one of the chuck pieces 6315 is inserted into the space W under an opened state of the chuck 6313. Then, the chuck 6313 is closed, and the chuck 6313 is moved away from the taking-out mechanism 65 against a magnetic force of the magnet 6503. The spring 3 is thus delivered from the taking-out mechanism 65 to the chuck 6313. The pin hole 307 of the spring 3 is engaged with the pin 51 to open the chuck 6313. Thus, the spring 3 is magnetically attached to the magnet 5913, moved away from the chuck 6313, and delivered to the pin 51.

Figure 20:
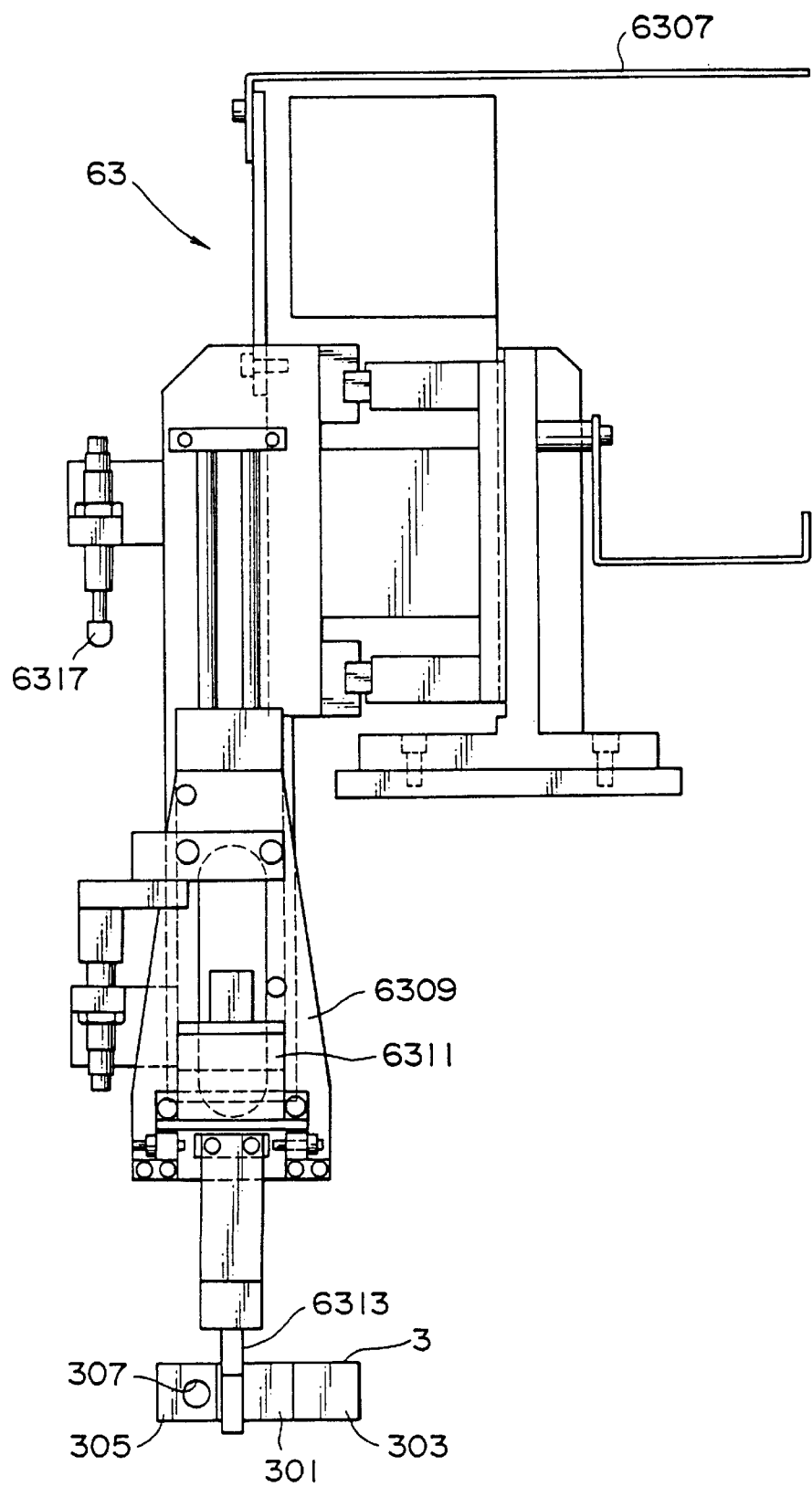
FIG. 20 is a view taken along an arrow E in FIG. 19.

FIG. 20 is a view taken along an arrow E in FIG. 19.

As shown in FIG. 6, the spring welding means 19 is comprised of a supporting table 1901 supported on the table 11 in such a way that it may be ascended or descended and movable in a lateral direction. An ascending or lateral moving mechanism (not shown) is used for ascending or descending the supporting table 1901 or moving it in a longitudinal direction of the upper lateral member 103. Supporting pieces 1903 are vertically arranged from locations spaced apart in a forward or rearward direction of the supporting table 1901, respectively. Electrodes 1905 are each supported at an inner surface of each of the supporting pieces. A cylinder 1907 is used for moving the rear side electrode 1905 toward or away from the front side electrode 1905.

Each of the electrodes 1905 is positioned at an inside location of the spring holder 111 and an outside location of the base end 303 of the spring 3 when the apertured grill 1 is fixed and supported by the spring supporting parts 21, 23. The base part 303 of the spring 3 abuts against and fixes to the outer surface of the spring holder 111 of the upper lateral member 103 with the spring supplying means 17.

The spring welding means 19 is constructed such that when the cylinder 1907 is operated, both electrodes 1905 are moved to the apertured grill 1. They are fixed and supported by the spring supporting parts 21, 23. Thus the electrodes each contact the inner surface of the spring holder 111 and the outer surface of the base part 303 of the spring 3, respectively. Both electrodes are electrically energized to cause the spring holder 111 and the spring 3 to be welded through spot welding.

Next, the welding operation of the spring 3 performed with the welding device 7 will be described.

At first, the pins 29, 33 of the spring supporting parts 21, 23 and the pin 51 of the spring position setting means 15 are moved in advance outward of the table 11 under operations of the moving mechanism 31 and the forward or rearward moving mechanisms 39, 57. When this occurs, the apertured grill 1 is arranged inside each of the pins 29, 33 and 51.

Then, each of the pin holes 307 of the springs 3 of the right and left vertical members 105 is placed adjacent to the pin 29, respectively. After that, each of the pins 29 is moved toward the apertured grill 1 by the moving mechanism 31 to cause the pins 29 to be engaged with the pin holes 307 of the springs 3 of the right and left vertical members 105.

Then, when the springs 3 are welded to the three spring holders 111 of the lower lateral member 103, and the right and left vertical members 105, a relative position of the pin 33 with respect to the pin 29 coincides with a relative arrangement of three pins 505 of the lower, right and left skirts 503. This is indexed in reference to fixing positions of the pins 505 against each of the skirts 503 of the panel 5 and locations of the three pin holes 307 calculated in response to a result of measurement of twistings of the panel 501 and the grill 107. The lateral moving mechanism 37 is operated and the position of the pin 33 in a longitudinal direction of the lower lateral member 103 is adjusted accordingly.

Then, the pin 33 is moved to the apertured grill 1 by the forward or rearward moving mechanism 39. The pin 33 is engaged with the pin hole 307 of the spring 3 of the lower lateral member 103. The apertured grill 1 is fixed by the upper and lower fixing parts 25, 27, and thus the apertured grill 1 is fixed and supported.

Next, one spring 3 is taken out of the magazine 61 by the taking-out mechanism 65 of the spring supplying means 17. This spring 3 is transferred by the delivering mechanism 63 to the spring position setting means 15. The pin hole 307 is engaged with the pin 51 and at the same time the intermediate part 301 is magnetically attached to the magnet 5913.

Then, relative positions of the pins 51 with respect to the pins 29, 33 coincide with the relative locations of the pins 505 of the upper, lower, right and left skirts. These are indexed in reference to the locations of the three pin holes 307 calculated when the springs 3 are welded to the three spring holders 111. The lateral moving mechanism 55 and the ascending or descending moving mechanism 59 are operated to adjust the position of the pin 51 in the longitudinal direction of the upper lateral member 103 and the vertical direction of the table 11.

Then, the pin 51 is moved to the apertured grill 1 by the forward or rearward moving mechanism 57. The base end 303 of the spring 3 engaged with the pin 51 is abutted against and fixed to the spring holder 111 of the upper lateral member 103.

Then, the supporting table 1901 of the spring welding means 19 is ascended or descended or moved in a longitudinal direction of the upper lateral member 103 by the ascending or descending and the lateral moving mechanisms in response to the relative position of the pin 51 in respect to the pins 29, 33 which are already indexed in advance. Both electrodes 1905 are placed adjacent to each inner surface of the spring holder 111 and the outer surface of the base part 303 of the spring 3, respectively.

In addition, both electrodes 1905 are moved from each other by the cylinder 1907 to contact with the spring holder 111 and the base part 303 of the spring 3, respectively. Both electrodes 905 are electrically energized so as to weld the spring holder 111 and the spring 3.

After the spring holder 111 and the spring 3 are welded, the spring welding means 19, the spring position setting means 15, the upper and lowerfixing parts 25,27, and the spring supporting parts 21, 23 are returned in sequence to their original states in accordance with the procedure opposite to the aforesaid procedure. The apertured grill 1 is removed from the table 11, and the next apertured grill 1 is located inside each of the pins 29, 33 and 51.

Then, subsequently, the spring 3 is continued to be welded to the spring holder 111 of the upper lateral member of each of the apertured grills 1 through a repetition of the aforesaid operation.

The positions of the pins 29, 33 when the apertured grill 111 is fixed and held and the position of the pin 51 for the position setting springs 3 are individually determined for every apertured grill 1 based on the locations of the three pin holes 307 calculated with reference to the measurement of the twistings of the grill 107 of the apertured grill 1 and the panel 501 of the mating panel 5. This is done for fixing the grill 107 and the fixing position of the pin 505 of the panel 5.

As described above, in accordance with the preferred embodiment, the remaining one spring 3 is welded to the spring holder 111 of the upper lateral member 103 in such a way that the locations of the pin holes 307 are indexed to cause the spaces between the surface of the grill 107 and the inner surface of the panel 501 to be always kept constant at any location when the apertured grill 1 is fixed to the panel 5. This is the result of measurement of the fixing position of the pin 505 against each of the skirts 503 of the panel 5 and the twistings of the panel 501 and the grill 107. The spring 3 is welded in advance to the spring holders 111 of the lower lateral member 103, and the right and left vertical members 105 so as to cause the pin holes 307 to be positioned at the indexed locations. The apertured grill 1 is positioned in such a way that the relative position of the pin holes 307 of the welded three springs 3 coincides with a relative location of the pins 505 of the lower, right and left skirts 503 of the panel 5. Additionally, the pin hole 307 is positioned at the aforesaid indexed location.

Thus, it is possible to accurately weld of each of the springs 3 to the spring holders 111 without disordering the relative position of the pin hole 307 for each of the springs 3 even if the four springs 3 are not simultaneously welded to the spring holders 111 of each of the upper, lower, right and left members 103, 105.

In addition, since the welding of the springs 3 to the spring holders 111 of the lower lateral member 103, and the right and left vertical members 105 is carried out in advance, the two welding means for the upper and lower lateral members 103 are not arranged side-by-side between the upper and lower lateral members 103. This eliminates the small clearance when the three springs 3 are welded. In accordance with the invention only the welding means for the lower lateral member 103 is required to be arranged, so that the welding can be performed without any trouble even for a CRT having a relative small screen size, such as 16", for example.

In addition, when the method of the present invention is to be carried out, the construction of the welding device for use in welding the springs 3 to the spring holders 111 of the lower lateral member 103, the right and left vertical members 105 or the constitution of the welding device 7 for welding the springs 3 to the upper lateral member 103 is not limited to the constitution disclosed in the preferred embodiment. Rather it is optional and it is also optional to select which spring 3 is applied for a later welding such as an operation in which the spring 3 of the lower lateral member 103 is welded after welding of the springs 3 of the other remaining three members 103 and 105 in place of the spring 3 of the upper lateral member 103.

As described above, according to the present invention, a color cathode ray tube comprises a panel which includes upper, lower, right and left skirts that extend from and are formed from the four sides of the panel. The panel has apertured grill fixing pins fixed to the aforesaid four skirts, and the apertured grill arranged inside the aforesaid panel has color selecting grills arranged adjacent to the aforesaid panel inside the four sides facing against each of the aforesaid skirts. When the panel fixing springs having pin holes engageable with the aforesaid pins are welded to each of the sides of the aforesaid apertured grill, each of the pin holes of each of the aforesaid springs against the aforesaid grill is indexed based on a position of each of the aforesaid pins against the aforesaid panel. Three of the aforesaid springs are welded simultaneously to the three sides of the aforesaid apertured grill in such a way that the pin holes may be positioned at the aforesaid indexed positions, respectively. Then a spring is abutted against one side where the aforesaid springs are not welded with the aforesaid apertured grill, the aforesaid abutted spring is positioned in such a way that an arrangement of the pin hole of the aforesaid spring and the pin holes of the springs welded to the aforesaid three sides may coincide with an arrangement of the aforesaid four pins. Next, the aforesaid position set spring is welded to one side of the aforesaid apertured grill.

In addition, in accordance with the present invention, the present invention provides a post-fixing spring welding apparatus for welding a spring to one side having the aforesaid spring not welded with the aforesaid apertured grill. The color cathode ray tube comprises a panel, having upper, lower, right and left skirts extended therefrom and formed with the sides of the panel. The panel having the apertured grill fixing pins fixed to the aforesaid four skirts, the apertured grill arranged inside the aforesaid panel and having color selecting grills arranged inside the four sides adjacent to each of the aforesaid skirts in such a way that a space with the aforesaid panel may become constant. The panel fixing springs having pin holes engaged with the pins of the aforesaid three skirts to which the aforesaid three sides are adjacent under a condition in which the springs are welded to the three sides of the four sides of the aforesaid apertured grill and the aforesaid apertured grill is arranged inside the aforesaid panel.

The first three position setting pins are located at each of the reference locations coinciding with the arrangement of the pins of the aforesaid three skirts and engaged with each of the pin holes of the springs at the aforesaid three skirts. The first engaging and disengaging moving mechanism moves each of the aforesaid first position setting pins between the aforesaid reference locations and a location where each of the aforesaid first position setting pins is disengaged from the pin holes of the springs at the aforesaid three sides. A fourth position setting pin placed adjacent to one side of the aforesaid apertured grill under a state in which each of the aforesaid first three position setting pins is engaged with the pin holes of the springs at the aforesaid three sides, and further an arrangement against the aforesaid first three position setting pins is arranged at the reference location coinciding with the arrangement of the pin at the remaining one skirt against the pins of the aforesaid three skirts.

A second engaging and disengaging moving mechanism is used for moving the aforesaid fourth position setting pin from the aforesaid reference location of the aforesaid fourth position setting pin to a location where it is moved from the aforesaid reference location to a direction spaced apart from the aforesaid one side rather than the aforesaid reference location. A spring supplying means supplies a spring to be welded to one side of the aforesaid apertured grill to the aforesaid fourth position setting pin and for engaging the pin hole of the aforesaid spring to the aforesaid second position setting pin. A spring welding means welds the aforesaid spring having the pin hole engaged with the aforesaid fourth position setting pin to one side of the aforesaid apertured grill at the aforesaid reference location of the aforesaid fourth position setting pin.

Due to this fact, in the case that the four panel fixing springs are welded to the four sides of the apertured grill, it is possible to perform an accurate welding of each of the springs to the apertured grill without disordering the relative position of the pin holes of each of the springs. This is true even if the four springs are not simultaneously welded. The invention also provides easy welding of the springs while keeping a wide space around the springs without fixing the apertured grill to the panel.

What is claimed is:

1. A method for welding springs to an apertured grill, wherein the springs connect the apertured grill to a panel and the panel includes first, second, third and fourth skirts which extend from corresponding first, second, third and fourth sides of the panel with fixing pins located on said first, second, third and fourth skirts, said method comprising the steps of:

welding respective first, second, and third fixing springs to corresponding first, second and third sides of said apertured grill such that pin holes in said springs are positioned in alignment with respective fixing pins on said skirts substantially at a same time;

after said step of welding said first, second and third springs, locating a fourth spring at a fourth side of said apertured grill in alignment with the fourth fixing pin on said fourth skirt and thereafter welding the fourth fixing spring to the apertured grill.

2. A fixing spring welding apparatus comprising:

first, second and third position setting pins located at corresponding first, second and third reference locations coinciding with a location of corresponding first, second and third fixing pins on three skirts of a panel and engaged with respective pin holes of corresponding first, second and third fixing springs located on respective first, second and third sides of said apertured grill;

welding means for welding said first, second and third fixing springs to said apertured grill;

a first engaging and disengaging moving mechanism for moving said first, second and third position setting pins between said reference locations and a location where each of said first, second and third position setting pins is disengaged from the pin holes of the first, second and third fixing springs after welding the first, second and third fixing springs with the welding means;

a fourth position setting pin placed adjacent to a fourth side of said apertured grill;

a second engaging and disengaging moving mechanism for moving said fourth position setting pin to a fourth reference location;

spring supplying means for supplying a spring and for engaging the pin hole of said spring with said fourth position setting pin; and welding means for welding said spring having its pin hole engaged with the said fourth position setting pin to the fourth side of the said apertured grill after said first, second and third fixing springs have been welded to said apertured grill.

3. A fixing spring welding apparatus for an apertured grill according to claim 2 in which said reference location of said fourth position setting pin with the second engaging and disengaging moving mechanism is determined by positions of said first, second and third fixing pins and a fourth fixing pin after said first second and third fixing springs are welded to the apertured grill.

4. A method for securing fixing springs to an apertured grill comprising the steps of:

welding first, second, and third fixing springs to corresponding first, second and third sides of an apertured grill substantially at a same time;

aligning a fourth fixing spring with respect to a corresponding fixing pin on a skirt of a panel based on a measured position of the fourth fixing pin after welding the first, second and third fixing springs to the apertured grill; and welding the fourth fixing spring to the apertured grill after the first, second and third fixing springs have been welded to the apertured grill.

* * * * *